(12) United States Patent
Seiler et al.

(10) Patent No.: US 10,736,337 B2
(45) Date of Patent: Aug. 11, 2020

(54) FROZEN BEVERAGE MACHINE CONTROL SYSTEM AND METHOD

(71) Applicant: FBD PARTNERSHIP, LP, San Antonio, TX (US)

(72) Inventors: Daniel J Seiler, Schertz, TX (US); R. Craig Cobabe, Boerne, TX (US)

(73) Assignee: FBD Partnership, LP, San Antonio, TX (US)

( * ) Notice: Subject to any disclaimer, the term of this patent is extended or adjusted under 35 U.S.C. 154(b) by 0 days.

(21) Appl. No.: 15/919,330

(22) Filed: Mar. 13, 2018

(65) Prior Publication Data

US 2018/0199589 A1 Jul. 19, 2018

Related U.S. Application Data

(63) Continuation-in-part of application No. 15/049,547, filed on Feb. 22, 2016, and a continuation-in-part of application No. 15/049,563, filed on Feb. 22, 2016.

(60) Provisional application No. 62/470,415, filed on Mar. 13, 2017, provisional application No. 62/120,602, filed on Feb. 25, 2015.

(51) Int. Cl.
| | |
|---|---|
| *A23G 9/04* | (2006.01) |
| *F25B 47/02* | (2006.01) |
| *F25C 5/10* | (2006.01) |
| *A23G 9/22* | (2006.01) |
| *F25B 25/00* | (2006.01) |
| *F25B 40/00* | (2006.01) |

(52) U.S. Cl.
CPC ............ *A23G 9/228* (2013.01); *A23G 9/045* (2013.01); *F25B 25/005* (2013.01); *F25B 40/00* (2013.01); *F25B 47/02* (2013.01); *F25B 47/022* (2013.01); *F25B 2700/1931* (2013.01)

(58) Field of Classification Search
CPC .. F25C 5/10; F25C 2301/002; F25C 2500/08; A23G 9/045; F25B 47/022; F25B 47/025; F25B 2313/02322; F25B 2347/02; F25B 2347/023; F25B 2400/0403; F25B 2600/02; F25B 2600/027; F25B 2600/0272

See application file for complete search history.

(56) References Cited

U.S. PATENT DOCUMENTS

| | | |
|---|---|---|
| 2,236,620 A | 4/1941 | Cornelius |
| 2,276,811 A | 3/1942 | Ward |
| 2,562,638 A | 7/1951 | Philipp |
| 2,610,478 A | 9/1952 | Lofstedt |
| 2,735,276 A | 2/1956 | Thompson |
| 2,934,911 A | 5/1960 | Micai et al. |
| 3,030,976 A | 4/1962 | Brown |
| 3,280,459 A | 10/1966 | Walker |
| 3,468,137 A | 9/1969 | Welty |
| 3,517,524 A | 6/1970 | Fielder |
| 3,661,303 A | 5/1972 | Prosenbauer |

(Continued)

FOREIGN PATENT DOCUMENTS

WO 2009124786 10/2009

*Primary Examiner* — Frantz F Jules
*Assistant Examiner* — Erik Mendoza-Wilkenfel
(74) *Attorney, Agent, or Firm* — McAughan Deaver PLLC

(57) ABSTRACT

A machine for producing frozen comestibles having a control system based on one or more operational characteristics, including product characteristics, to control the consistency and quality of the comestible, and to extend the useful lifespans of its components.

18 Claims, 12 Drawing Sheets

(56) References Cited

U.S. PATENT DOCUMENTS

| | | | | |
|---|---|---|---|---|
| 3,677,272 | A | 7/1972 | Shrank | |
| 4,201,558 | A * | 5/1980 | Schwitters | A23G 9/045 137/594 |
| 4,213,795 | A | 7/1980 | Emstsson | |
| 4,590,970 | A | 5/1986 | Mott | |
| 4,632,275 | A * | 12/1986 | Parks | B67D 1/0021 222/129.1 |
| 4,719,056 | A * | 1/1988 | Scott | B01F 3/04765 222/129.2 |
| 4,736,600 | A | 4/1988 | Brown | |
| 4,745,853 | A * | 5/1988 | Hoover | A23L 2/54 261/27 |
| 4,784,697 | A | 11/1988 | Bordini | |
| 5,270,013 | A | 12/1993 | Decker | |
| 5,388,925 | A | 2/1995 | Wilcox | |
| 5,553,756 | A | 9/1996 | Topper | |
| 5,632,411 | A | 5/1997 | Harty | |
| 5,706,661 | A * | 1/1998 | Frank | A23G 9/045 426/67 |
| 5,740,844 | A | 4/1998 | Miller | |
| 5,743,433 | A * | 4/1998 | Hawkins | B67D 1/0057 222/129.2 |
| 5,899,077 | A | 5/1999 | Wright | |
| 5,974,824 | A | 11/1999 | Galockin | |
| 6,161,558 | A | 12/2000 | Franks | |
| 6,189,745 | B1 | 2/2001 | Frank | |
| 6,296,153 | B1 * | 10/2001 | Bilskie | B67D 1/103 222/129.2 |
| 6,622,510 | B2 | 9/2003 | Giroux et al. | |
| 6,708,510 | B2 | 3/2004 | Sulc et al. | |
| 7,114,707 | B2 | 10/2006 | Rona et al. | |
| 7,562,793 | B2 | 7/2009 | Ufheil | |
| 8,079,230 | B2 | 12/2011 | Frank | |
| 8,136,363 | B2 | 3/2012 | Ludwig | |
| 8,528,786 | B2 | 9/2013 | Gates | |
| 8,646,286 | B2 | 2/2014 | Scherer et al. | |
| 8,701,939 | B2 | 4/2014 | Frank | |
| 9,107,449 | B2 * | 8/2015 | Njaastad | A23L 2/54 |
| 9,173,521 | B2 | 11/2015 | Gates | |
| 9,388,033 | B2 | 7/2016 | Gates | |
| 9,457,386 | B2 | 10/2016 | Gates | |
| 9,638,434 | B2 | 5/2017 | Alston | |
| 9,970,696 | B2 | 5/2018 | Hegar et al. | |
| 10,034,488 | B2 | 7/2018 | Graczyk | |
| 10,321,699 | B2 | 6/2019 | Gates | |
| 10,327,455 | B2 | 6/2019 | Gates | |
| 2002/0043071 | A1 | 4/2002 | Frank | |
| 2002/0083730 | A1 * | 7/2002 | Giroux | B67D 1/02 62/354 |
| 2004/0124548 | A1 * | 7/2004 | Rona | B01F 3/04531 261/64.3 |
| 2006/0186137 | A1 | 8/2006 | Till | |
| 2007/0017234 | A1 | 1/2007 | Moulder | |
| 2007/0062212 | A1 | 3/2007 | Frank | |
| 2007/0125104 | A1 | 6/2007 | Ehlers | |
| 2008/0006050 | A1 * | 1/2008 | Gist | A23G 9/28 62/354 |
| 2008/0073609 | A1 | 3/2008 | Akkermann | |
| 2008/0202130 | A1 | 8/2008 | Kadyk | |
| 2008/0203113 | A1 | 8/2008 | Groh | |
| 2008/0254180 | A1 | 10/2008 | Windhab | |
| 2008/0289357 | A1 | 11/2008 | Skobel | |
| 2008/0302824 | A1 | 12/2008 | Blomme | |
| 2009/0000315 | A1 * | 1/2009 | Billman | A23G 9/28 62/73 |
| 2009/0211269 | A1 | 8/2009 | Gist et al. | |
| 2010/0044395 | A1 | 2/2010 | Webb | |
| 2010/0293965 | A1 | 11/2010 | Frank | |
| 2010/0319389 | A1 | 12/2010 | Yang et al. | |
| 2011/0042414 | A1 | 2/2011 | Tachibana | |
| 2011/0049190 | A1 | 2/2011 | Sevcik | |
| 2011/0192423 | A1 | 8/2011 | Boussemart | |
| 2012/0181287 | A1 | 7/2012 | Holbeche | |
| 2013/0140328 | A1 | 6/2013 | Gates | |
| 2014/0061345 | A1 | 3/2014 | Machovina | |
| 2014/0209635 | A1 | 7/2014 | Gates | |
| 2016/0229675 | A1 | 8/2016 | Popov | |
| 2016/0245564 | A1 | 8/2016 | Frank et al. | |
| 2016/0245573 | A1 | 8/2016 | Frank | |
| 2017/0027185 | A1 | 2/2017 | Acosta | |
| 2017/0027188 | A1 | 2/2017 | Raybin | |
| 2017/0030467 | A1 | 2/2017 | Versteeg | |
| 2017/0064977 | A1 | 3/2017 | Bischel | |
| 2018/0103656 | A1 | 4/2018 | Acosta | |
| 2018/0106515 | A1 | 4/2018 | Cobabe | |

\* cited by examiner

FROZEN BEVERAGE MACHINE CONTROL SYSTEM AND METHOD

CROSS REFERENCE TO RELATED APPLICATIONS

This application claims priority to U.S. Provisional patent application Ser. No. 62/470,415, filed Mar. 13, 2017, and is a Continuation-in-part of U.S. patent application Ser. Nos. 15/049,547 and 15/049,563, both filed Feb. 22, 2016, which claim priority to U.S. Provisional Patent Application 62/120,602, filed on Feb. 25, 2015, the contents of which are incorporated by reference herein in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to frozen beverage machines; and more specifically relate to improved methods of and apparatuses for controlling the consistency and quality of the dispensed beverage product, and for extending the useful lifespans of its components.

Description of the Related Art

Frozen beverage machines are known in the art and have been used for years. These devices produce, for example, a frozen carbonated beverage (FCB) by freezing a mixture of ingredients typically including syrup, water and carbon dioxide in a freezing chamber. The mixture freezes on the inner surface of the chamber, which is surrounded by a helical coil through which a refrigerant passes. A rotating shaft is disposed inside the chamber that has a plurality of outwardly projecting blades that scrape the mixture off the inside wall of the freezing chamber. Once the carbonated beverage is in the desired frozen state, the product is dispensed from the chamber through a product valve.

The temperature and viscosity of the ingredients within the mixing chamber are maintained by a control system that controls the refrigeration system. A common current method for controlling frozen beverage dispensing utilizes the freezing chamber, which is a space enclosed within an evaporator in a refrigeration system to make a frozen beverage product. The physical behavior and the state of the beverage product are constantly changing within the freezing chamber. The expansion and contraction of the beverage product may be unpredictable. The control system also controls the amount of the ingredients injected into the mixing chamber to maintain the quantity of such ingredients within the chamber at a prescribed amount. Such control systems typically include a pressure responsive device that controls the amount of ingredients fed into the chamber in response to the freezing chamber pressure.

Typically, the pressure of the frozen beverage, which may contain a gas such as carbon dioxide, within the freezing chamber is maintained above atmospheric pressure. Also, the temperature of the frozen beverage within the freezing chamber is maintained below the freezing point of water at atmospheric pressure, but above the temperature where the liquid readily freezes at the pressure within the chamber. The viscosity of the liquid typically must also be maintained within prescribed limits. Under these conditions of temperature and pressure, and with the viscosity suitably maintained, the frozen beverage is dispensed from the chamber through the product valve to a receptacle such as a cup or mug at atmospheric pressure, in a semi-frozen state similar to frozen foam.

The quality of the product is also determined by the ratio of the mixture of the syrup, water, and a gas medium such as carbon dioxide or nitrogen. The ability to control and adjust this mixture is a function of the ability to accurately monitor and control liquid levels, pressures, temperatures, and carbon dioxide content. While other factors such as syrup content also affect the quality of the product, the amount of carbonation is a strong contributing factor. A major drawback of known frozen carbonated beverage machines is their inability to maintain proper control over the liquid levels, pressures, temperatures, and the carbon dioxide content entering the mixing chamber, to produce a consistently high quality product.

A common current method for controlling a frozen beverage machines barrel's refreeze cycle is based on the beater motor's torque (or power consumption) as it has been found that a mixture of ingredients becomes more viscous as it freezes. When the measured torque on the motor drops below a specified threshold, the machine initiates a freeze cycle and freezes the barrel until the torque on the motor reaches a higher specified torque. One observed issue with using the motor's torque is that the machine may, over time, begin to freeze more often. The time between freeze cycles becomes shorter, and the product in the barrel can become too cold. If the barrel is not defrosted sufficiently often, the product in the barrel may not dispense as expected out of the valve. Another issue is that dispensing small drinks may trigger a refreeze when the barrel should not be required to refreeze. All observed issues with the current control method reinforce the idea that the torque of the motor may not be an optimal indicator for triggering a refreeze.

One concern about frozen beverage dispensers is the total cost of ownership (TCO). An owner/operator of a frozen beverage dispenser would prefer the purchase cost of the appliance be low, and that there be few or no service calls to replace parts that become worn from use. It may be generally considered that parts made of higher quality materials may last longer than parts made of inferior materials. However, using the higher quality parts are usually more expensive and would likely increase the initial cost of the appliance. On the other hand, using inferior parts, while reducing the initial cost, would require more service calls to address worn parts.

Another problem with prior art frozen beverage dispensers is in the physical electrical connections within the body of the dispenser. A common request has been to make the overall appliance smaller so that it takes up less space on a counter or in a service area. Making the appliance smaller necessitates that the interior of the dispenser be condensed to the point where the physical contacts for the connections to the electronics, the sensors, and other wiring be made smaller. This has led to errors in assembly, or repair technicians placing a sensor wire on the incorrect terminal.

Other problems with existing frozen beverage machines: (i) inconsistent ice crystal size and (ii) inconsistent barrel pressure which may cause: (a) excessively high barrel pressure leading to undesirably high dispense rates, (b) fluctuating barrel pressure leading to inconsistent ice crystal formation, (c) inconsistent drink quality, (d) "wet drinks" where expansion is too low and/or liquid/solid separation occurs, (e) cold drinks where the drinks are too stiff due to over freezing, (f) inconsistent "brightness" due to excessive pressure and gas within the barrel.

Several of the examples given in this specification relate to a frozen carbonated beverage. However, the inventions disclosed and taught herein are applicable to other forms of frozen food items such as, but not limited to shakes, smoothies, and soft-serve.

The inventions and subject matter disclosed and taught herein are directed to that which overcomes, or at least minimizes, some of these problems.

BRIEF SUMMARY OF THE INVENTION

As one of many possible brief summaries of the nature and substance of the inventions disclosed herein, a frozen beverage machine may comprise a freezing chamber having a product inlet and a product outlet; a refrigeration system for freezing a product in the freezing chamber; a dynamic charge control system comprising: a first chamber in fluid communication with the freezing chamber product inlet; a first chamber pressure transducer for measuring the pressure in the first chamber and providing a first pressure measurement to a controller; a second chamber separated from the first chamber by a bladder and comprising an inlet and an outlet; a fluid fill valve coupled to a source of a fluid and the second chamber inlet; a fluid vent valve coupled to the second chamber outlet for discharging a fluid; a second chamber pressure transducer for measuring the pressure in the second chamber and providing a second pressure measurement to the controller; a controller operationally coupled to receive an output from one or both of the first chamber pressure transducer and the second chamber pressure transducer and actuating the fluid fill valve or the fluid vent valve to align the received first pressure measurement with a desired pressure; wherein the controller dynamically adjusts the desired pressure based on at least one sensed operational characteristic of the machine.

Another one of many possible brief summaries of the nature and substance of the inventions disclosed herein, a frozen beverage machine may comprise a freezing chamber having a product inlet and a product outlet; a refrigeration system for freezing a product in the freezing chamber; a first chamber in fluid communication with the freezing chamber product inlet; a first chamber pressure transducer for measuring the pressure in the first chamber and providing a pressure measurement to the controller; means for adjusting the pressure in the first chamber including a controller operationally coupled to receive an output from the first chamber pressure transducer and to align the received pressure measurement of the first chamber with a desired pressure; wherein the controller dynamically adjusts the pressure in the first chamber based on at least one sensed operational characteristic of the machine.

Yet another one of many possible brief summaries of the nature and substance of the inventions disclosed herein, a frozen beverage machine, may comprise a freezing chamber having a product inlet and a product outlet; a refrigeration system for freezing a product in the freezing chamber; a gas chamber comprising an inlet and an outlet and operationally coupled to the freezing chamber; a gas chamber pressure transducer for measuring the pressure in the gas chamber and providing a pressure measurement to the controller; a gas fill valve operationally coupled to a source of a gas and operationally coupled to the inlet of the gas chamber; a gas exhaust valve operationally coupled to the outlet of the gas chamber; a controller operationally coupled to receive an output from the gas chamber pressure transducer and to align the received pressure measurement of the gas chamber with a desired pressure; and wherein the controller dynamically adjusts the desired pressure in the gas chamber based on at least one sensed operational characteristic of the machine.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
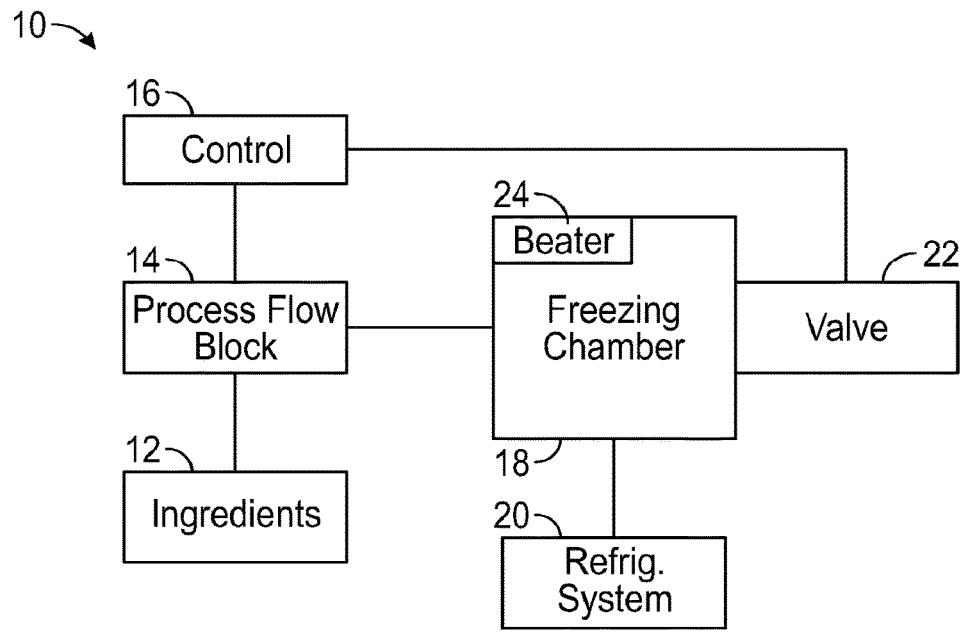
FIG. 1 is a block diagram conceptually illustrating portions of an exemplary frozen beverage machine in accordance with certain teachings of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicants have created methods of and apparatuses for measuring and controlling the solution in a frozen beverage machine to control the consistency and quality of the dispensed beverage product.

FIG. 1 is a simplified block diagram schematically illustrating components of an exemplary frozen beverage machine 10 in accordance with certain teachings of, or could be used in conjunction with the present disclosure. The frozen beverage machine 10 includes an ingredients supply source 12, a process flow block 14, a controller 16, and a product chamber or barrel 18. In the exemplary frozen beverage machine 10, the ingredient supply source 12 may include, for example, a water supply, syrup supply and a gas supply. In the illustrated embodiment, the barrel 18 comprises a freezing chamber having a refrigeration system 20 associated therewith. The barrel 18 further comprises a beater 24. The product chamber or barrel 18 may be an evaporator in the refrigeration system 20. The frozen beverage machine 10 may alternatively have one or more barrels. Further descriptions of frozen beverage machines are provided in U.S. Pat. Nos. 5,706,661; 5,743,097; 5,799,726; 5,806,550; 6,536,224 and 6,625,993, along with U.S. Patent Application Publication Nos. 2016/0245573 and 2016/0245564, by J. I. Frank, et. al. The entire disclosures of these patents are incorporated by reference. Other known frozen beverage machines may be used in conjunction with methods and apparatuses disclosed in the present disclosure.

The barrel 18 is where product or liquid is frozen and maintained before dispensing. Initial pull down (IPD) is a process of freezing the initial ingredients introduced into the barrel 18 from a liquid state to a frozen ready-to-serve state. This occurs when the mixture of ingredients in the barrel is already liquid and needs to be frozen. The thaw period or defrost cycle occurs when one of the barrels 18 of the frozen beverage machine 10 is turned on, but the refrigeration system 20 is off. The product or liquid in the barrel 10 is frozen and ready to serve, but is naturally thawing and not being cooled by refrigeration system 20. The freeze cycle or refreeze cycle occurs when one of the barrels 18 of the frozen beverage machine 10 is turned on and the refrigeration system 20 is on. The product in the barrel is already frozen but out of an optimal range. Thus, freezing/cooling the product is required in order to maintain drink quality. A freeze cycle usually occurs between thaw cycles. Beater percentages (%) is a software variable displayed, which may be displayed on the user interface of frozen beverage machine 10, that indicates the torque load on the motor driving the beater 24. Beater percentage is inversely proportional to motor load; as the variable drops, the load increases. In one exemplary embodiment, 1000% is a liquid-barrel load and an optimally frozen product has a load range of 700-900%.

Ingredients for a frozen beverage mixture are provided from the ingredient supply 12 to the process flow block 14, which controls the flow of the ingredients, also known as the beverage solution, into the freezing chamber 18 as directed by the controller 16. The controller 16 may comprise an appropriately programmed microcontroller and suitable memory devices along with appropriate sensors throughout the device. The consistency of the frozen mixture is controlled by any of a number of methods that turns on the refrigeration system 20 to freeze, and turns off the refrigeration system 20 when the mixture reaches the desired consistency. Suitable operation of the controller 16 and other control instrumentation using circuit boards, volatile and non-volatile memory devices, software, firmware, and the like is described, for example, in U.S. Pat. No. 5,706,661 incorporated by reference above. The product is then dispensed through a dispensing valve 22.

Applicants have further created improved methods and apparatuses to monitor and control the pressure of the frozen beverage system through electronic sensing, although mechanic sensing is also within the scope of the present disclosure.

Figure 2:
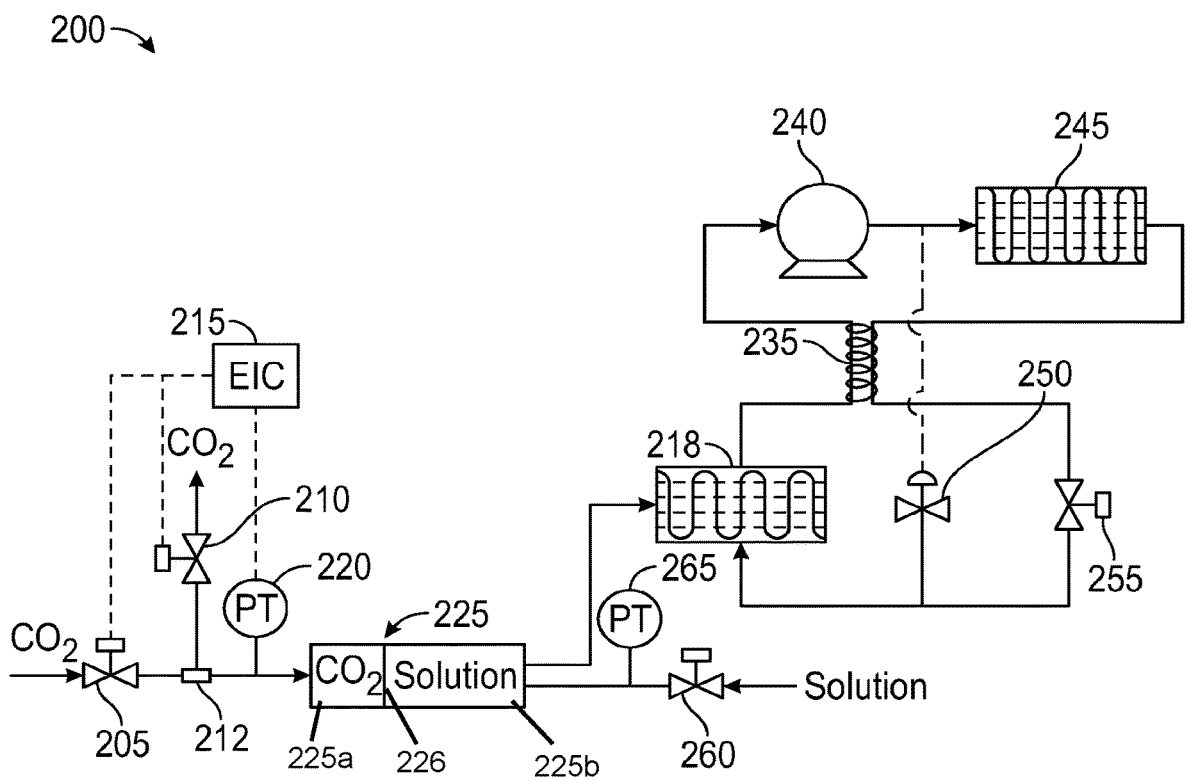
FIG. 2 is a schematic diagram of an exemplary frozen beverage machine in accordance with certain teachings of the present disclosure.
Figure 3:
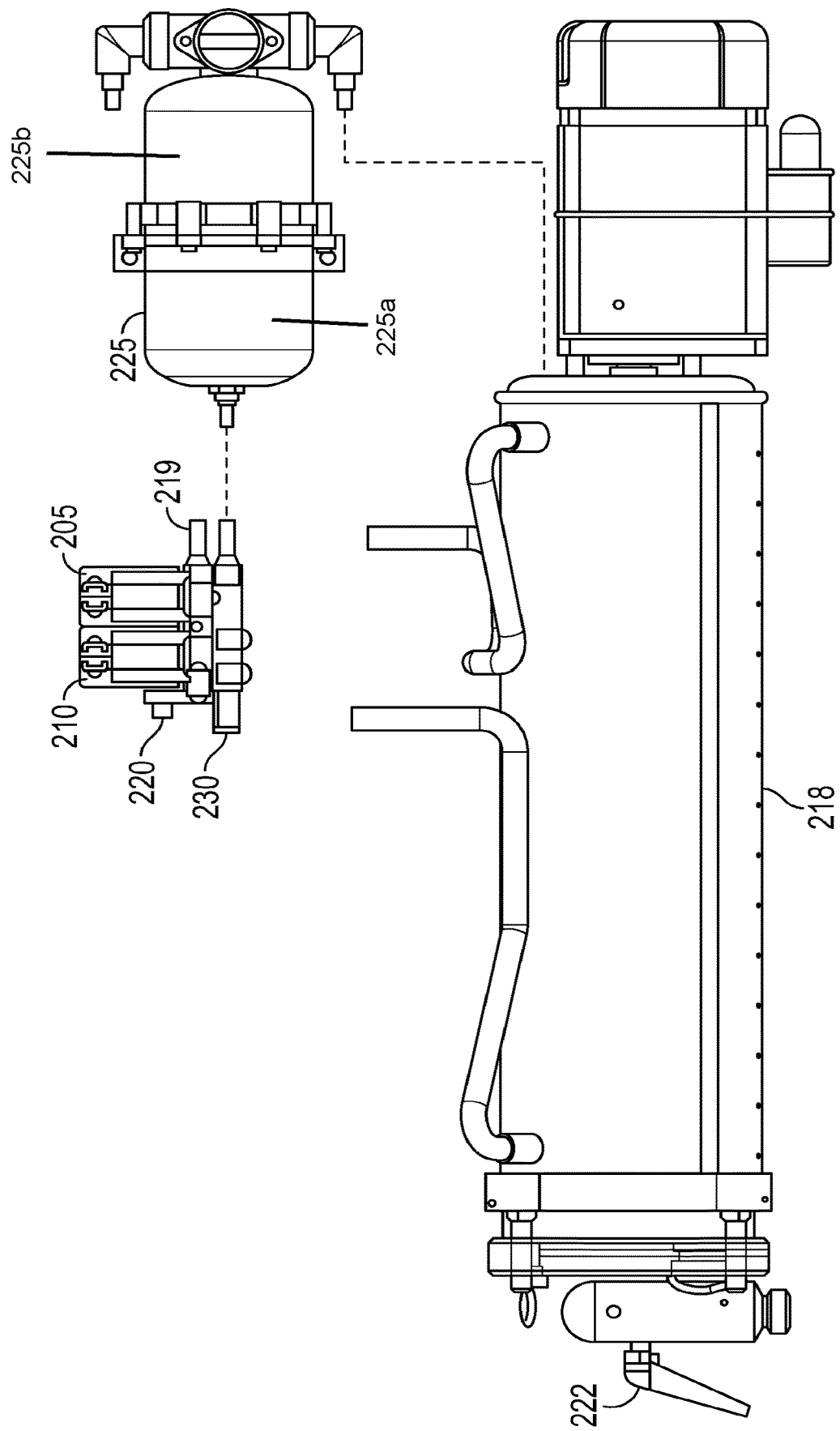
FIG. 3 is a view of a portion of the frozen beverage machine illustrated in FIG. 2 in accordance with certain teachings of the present disclosure.

As is shown in more detail in FIGS. 2 and 3, the dynamic charge control system (DCC) of the present invention typically consists of a pressure transducer 220, two electrically controlled solenoids 205, 210 to control supply and venting of gas, and a common manifold 212. The DCC typically utilizes a pressure sensing device to monitor and control the charge pressure by either supplying gas to or venting gas from the expansion tank 225, based on the user's desired pressure range, in other words, desired drink profile. The desired pressure range is dependent on the drink profile desired, and the user may have the ability to change the pressure range through a user interface.

FIG. 2 is a schematic diagram of a frozen beverage machine in accordance with certain teachings of the present disclosure. Referring to FIG. 2, the main components of a frozen beverage machine 200 are illustrated.

In the exemplary machine a general refrigeration system is provided that includes a compressor 240, a condenser 245, heat exchanger 235, defrost valve 250 and an expansion valve 255. The refrigeration system operates to provide refrigerant to the evaporation coils of a freezing chamber in the form of a barrel 218 either: (a) in the form of expanding liquid refrigerant through the expansion valves to cool the barrel or (b) in the form of hot gas from the compressor 240 to defrost the barrel 218.

The exemplary machine also includes a dynamic charge control system (DCC) that includes an expansion tank 225, which has two compartments, 225a and 225b. A first compartment 225b of the expansion tank 225 receives beverage solution through a solution solenoid 260. A second compartment 225a of the expansion tank 225 receives gas (typically $CO_2$ but may be air, nitrogen, or some other gas) through a supply solenoid 205 (or in alternative embodiments a supply regulator). A pressure transducer 220 is provided to detect the active charge pressure in the expansion tank 225 compartment 225a. A pressure transducer 265 is provided to detect the solution pressure within the expansion tank 225 compartment 225b. The output from the pressure transducer 220 is provided to an electronic interface controller 215 that operates to control the charge pressure in the expansion tank 225. In alternative embodiments, multiple expansion tanks may be utilized.

Adding gas medium to the second compartment 225a of the expansion tank 225 will serve to expand the volume of that compartment, thereby reducing the volume of the first compartment 225b. There expansion tank 225 will stabilize with both compartments having the same pressure. Since there is fluid communication between the first compartment 225b of the expansion tank 225 and the barrel 218, a pressure increase in the second compartment 225a of the expansion tank 225 will increase the pressure within the barrel 218. Conversely, a pressure decrease within the second compartment 225a of the expansion tank 225 will decrease the volume of that compartment thusly allowing the volume of the first compartment 225b to increase thereby decreasing the pressure of the barrel 218.

In other envisioned embodiments, other mechanisms may be used to control the pressure in the first compartment 225b. They may be, but are not limited to using a mechanical force, such as a piston, or using an incompressible fluid, such as water, to press against the bladder 226. Another envisioned embodiment may be to not have to use a bladder 226, but may change the volume of the first chamber through other mechanical devices, such as through the use of a compressible chamber.

FIG. 3 is a view of a portion of the frozen beverage machine illustrated in FIG. 2 in accordance with certain teachings of the present disclosure. In particular, FIG. 3 shows details of one embodiment of the expansion tank 225, the barrel 218, the dispensing valve 222, the supply solenoid 205, the exhaust solenoid 210 (or in alternative embodiments an exhaust regulator) and the pressure transducer 220. In the example of FIG. 3, the solenoids 205 and 210 are electronically controlled solenoids and they are integrated into a single unit with the pressure transducer 220, which will produce a signal that can be received and processed by a control processor. Pressure may be vented through the pressure vent 230 thereby reducing the volume of the second compartment 225a of the expansion tank 225. A fluid, such as $CO_2$, may be added to the first compartment 225b from an external source through the pressure supply opening 219.

In one embodiment of the process described, after a drink is dispensed, a volume of solution is moved into the expansion tank 225 from an external source, and an equal amount is moved from the expansion tank 225 into the barrel 218. This volume may approximate the volume of frozen beverage dispensed, but may not be exactly that volume. Therefore, to compensate and to keep the barrel at an optimum pressure, the DCC will make appropriate adjustments to the pressure in the barrel 218.

Applicants have found that the pressure in the barrel 218 may not be immediately represented in the expansion tank 225. As an example, in the condition of a freeze cycle in the barrel 218, the pressure in the barrel 218 will increase as the ice is formed, which does not dissolve as much gas as it did in liquid form. This pressure increase is immediately noticeable in the barrel 218, but may take several seconds to be seen by pressure indicators in the expansion tank 225.

$CO_2$ may be used to control the active charge pressure in the expansion tank 225. This is convenient when $CO_2$ is used in the solution to produce the drink, and a source of that gas may be nearby. Similarly, this may be nitrogen, which may be convenient if the drink has nitrogen in it and the gas is available. However, any other suitable gas including another inert gas, or even air may be used. In one of many possible envisioned embodiments, a small air pump may be used as a source for pressurized gas, rather than relying upon a compressed gas in a cylinder or other container.

Figure 4:
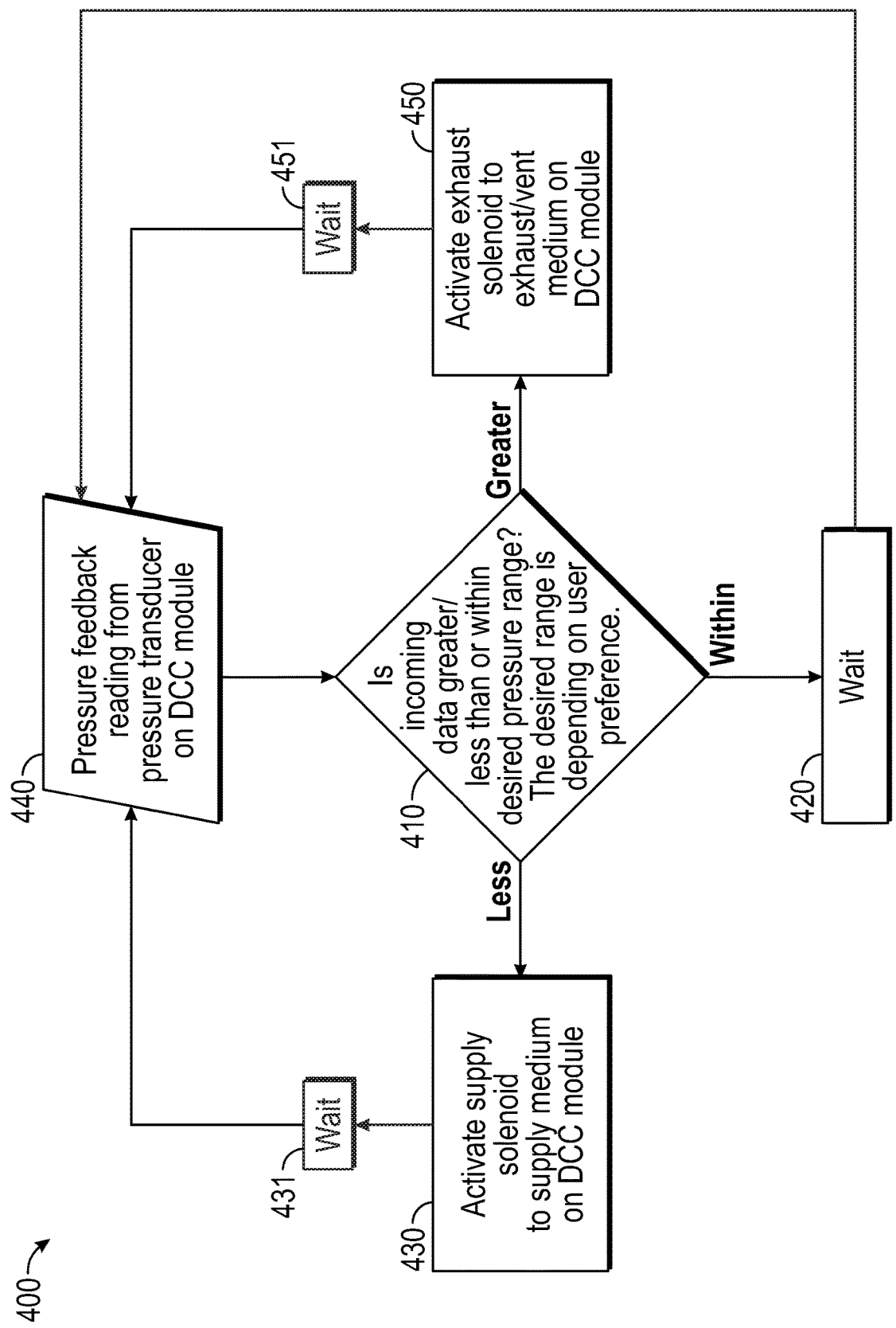
FIG. 4 is a flow diagram illustrating exemplary steps used in the control of a dynamic charge system in accordance with certain teachings of the present disclosure.

FIG. 4 is a flow diagram illustrating exemplary steps used in the control of a dynamic charge system in accordance with certain teachings of the present disclosure. FIG. 4 illustrates at a high level the method 400 used in the control of a dynamic charge system. In the initial step 440, the pressure is measured to determine whether the pressure sensed by pressure detector 220 is greater than, less than, or within the desired range depending on the user's preference, which is the desired drink profile. The range may be a range of values including for example a fixed setpoint/range and/or a dynamic setpoint/range. Setpoints, ranges and/or control logic for desired active charge pressure can be variable, and dependent on: (a) desired drink profile (e.g., lower pressures produce larger ice crystals and absorb less CO2); (b) product type (fountain syrup, FCB syrup, sugared syrup, low calorie, or diet syrups); (c) machine hardware configuration (size of evaporator, expansion tank size, etc). Setpoints and/or control logic may be modified by a user interface. For example, a user may enter a desired drink profile, product type, or machine hardware configuration. The user interface may include potentiometers, LCDs, touchscreens, and/or keypads.

If the pressure sampled in step 440 is within the desired range, a decision is made in step 410 to make no changes to the system. Processing may continue by looping back to the initial step 440 for sampling the pressure. In some instances, it may be desirable to wait a short amount of time 420 before returning to the sampling step 440. If the pressure sampled is determined to be above the desired range in step 410, then the vent, or exhaust, solenoid 210 is activated in step 450 to reduce the pressure of the expansion tank 225. Venting will start when the pressure exceeds the maximum allowable pressure in the DCC, and will stop when the pressure is measured to be below a minimum vent setpoint. Again, a short wait may be desired as indicated in step 451 before returning to sampling step 440. If the pressure sampled is determined to be at or below the desired range in step 410, then the fill, or supply, solenoid 205 is activated in step 430 to increase the pressure of the expansion tank 225. The fill process will continue until a maximum fill pressure is reached. Again, a short wait may be desired as indicated in step 431 before returning to sampling step 440. After either steps 430 or 450 is completed (or 431 or 451 if small time delays are wanted), a pressure feedback reading from the pressure transducer 220 is again made in step 440. After step 440, step 410 is completed and the loop begins again.

In process 400, care must be taken to ensure that the fill process does not inadvertently activate the vent process, and vice-versa. This may lead to oscillation of the fill and vent solenoids and may make the system unstable. As an example, the maximum fill pressure (the pressure at which the fill solenoid closes) should be measurably distinguishable from the pressure which activates the vent process (the pressure where the vent solenoid opens).

In general, the volume of the expansion tank 225 will be varied to maintain an optimal pressure that is within the preferred range desired within the barrel 218. This may be accomplished through various means known to those skilled in the art, which include the use of a tank that physically expands, or through the use of a bladder 226 separating the two compartments as 225a and 225b) that may be inflated or deflated within the expansion tank 225, or by controlling an amount of beverage solution within the expansion tank 225, or through a combination of these and many more options. These means are described in U.S. Patent Application Publication 2016/0245573, the contents of which are hereby incorporated by reference. When step 410 in FIG. 4 determines that the pressure in the barrel 218 is greater than the desired range, the exhaust solenoid 210 opens a pathway that allows gas medium to exit the second partition 225a of the expansion tank 225, yielding a larger volume for the solution in the first compartment 225b of the expansion tank 225 and the frozen beverage in the freezing chamber. Venting continues until the pressure is again within the desired pressure range. Conversely, if step 410 determines that the pressure in the expansion tank 225 falls below an optimal level, more gas medium may be added from an external source (not shown), such as a replaceable gas cylinder, by opening the fill solenoid 205. This yields a smaller volume in the first compartment 225b of the expansion tank and the freezing chamber producing a higher pressure. This fill process is continued until the pressure is again within the desired range.

The desired pressure may be established by the size of the desired ice crystals. It has been found that a lower pressure in the barrel 218 results in larger ice crystals, while higher pressure results in smaller ice crystals. The size of the ice crystals in the frozen beverage is sometimes a matter of preference by the consumer, and in some cases limited by the dispensing path of the beverage dispensing device. In some cases, crystals that are too large may cause clogging more frequently in the dispensing path. The pressure in the barrel 218 may be controlled to avoid this.

The cycle depicted in FIG. 4 would typically require few fills and vents if no drinks were dispensed. However, when a drink is dispensed, some of the frozen beverage in the barrel 218 will be dispensed. Solution will then be transferred from the expansion tank 225 to the barrel 218, and solution will also be injected into the expansion tank 225 from an external source (not shown.) In some cases, this may leave the barrel 218 above or below the desired pressure. If so, the system will need to fill or vent gas to the expansion tank 225 to reestablish the desired pressure.

At certain times, the barrel 218 will be defrosted so that the frozen beverage in the barrel 218 does not become too frozen. As the beverage in the barrel 218 warms during the defrost cycle, the pressure will decrease because more gas can be dissolved in the liquid solution than in the frozen solution. At that point, gas medium will need to be added to the second compartment 225a of the expansion tank 225 resulting in less volume in the first compartment 225b thereby increasing the pressure in the barrel 218. Conversely, when the frozen beverage reaches a temperature at the upper end of the desired range, the system will enter a freeze cycle to chill the beverage. During this time, the pressure in the barrel 218 will increase. Again, to maintain the quality of the drink, the system will vent some of the active charge gas to reduce the pressure in the barrel 218 by increasing the volume in the first compartment 225b of the expansion tank 225. These and other complexities in the operation of a frozen beverage dispensing device activate the fill and vent processes.

Recalling that the total cost of ownership is a concern, manufacturers of frozen beverage dispensing devices may know the life expectancy of the parts that are used to assemble a dispensing machine. Knowing this along with some statistics about how often drinks are dispensed will allow one skilled in the art to estimate an average life expectancy of a particular part. This process may be applied to solenoids used to fill and vent the gas medium into and out of the expansion chamber 225. One way to extend the foreseeable time needed to replace a solenoid would be to install a solenoid that will operate a larger number of times before it is expected to fail. That, however, usually comes at a greater cost, which would have to be passed along to the purchaser of the device. Another way would be to utilize a solenoid that will operate a lesser number of times before it is expected to fail, and operate it less frequently. As an example, solenoid "A" may have a warranty that indicates that it will operate twice as many times as indicated in the warranty for solenoid "B". Subsequently, solenoid "A" may cost twice as much as solenoid "B". However, to get the same life expectancy from solenoid "B" as from solenoid "A", solenoid "B" could be operated half as frequently as solenoid "A". Thus, both will be expected to last the same amount of time in operation.

As described earlier, optimal conditions of pressure have been established for the type of drink desired. Since the barrel will be in states of freezing and thawing, along with conditions of dispensing frozen beverages and refilling ingredients, the pressure in the barrel may vary. It has been found that establishing a range of pressure will still produce a frozen beverage with desired drink qualities including ice crystal size and with desired dispensing qualities including sound and resistance to splatter. To obtain these desirable qualities, the barrel pressure may be kept within this optimal range by filling and venting gas from the dynamic charge system. The fill process may start when the pressure is at the low point of the optimal range, and may end when the pressure is at the midpoint of the optimal range. The vent process may start when the pressure is at the high point of the optimal range and may end at the same midpoint. Other start and stop pressure points may be envisioned by those skilled in the art without departing from the inventions described in this disclosure.

It has further been found that there is a broader range, outside the optimal range, wherein the desirable drink and dispense qualities may be acceptable as long as those conditions are reset to the optimal pressure range as quickly as possible. In one embodiment, the fill process may start at a point below the low point of the optimal range, and may continue to increase pressure to some point within the optimal range. Similarly, the vent process may start at some point higher than the high point of the optimal range, and may continue until the pressure is reduced to some point within the optimal range. Variations of this process may be envisioned by others skilled in the art without departing from the inventive concepts described herein.

Figure 5:
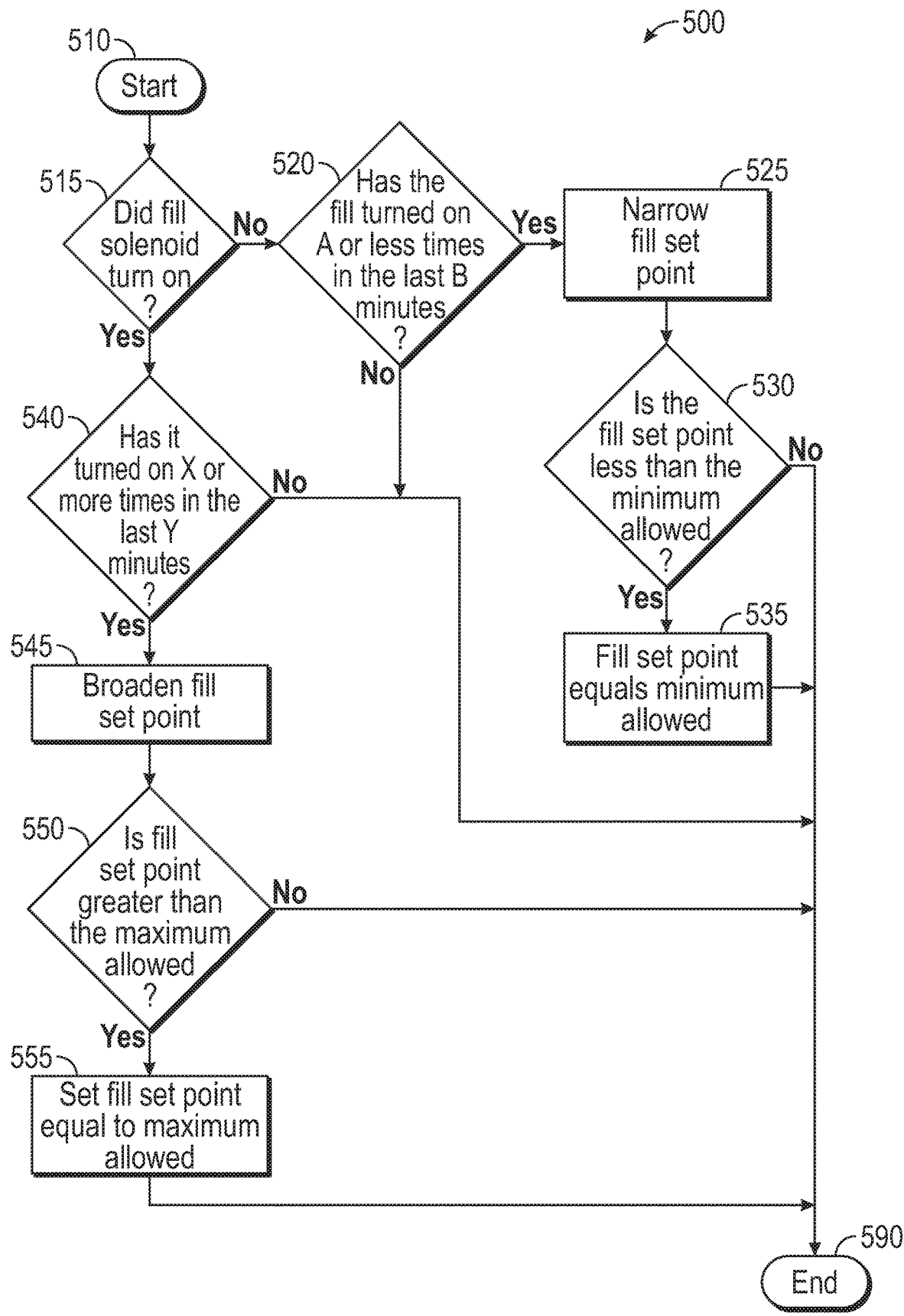
FIG. 5 is a flow diagram illustrating exemplary steps used in the fill control of a dynamic charge system in accordance with certain teachings of the present disclosure.

FIG. 5 depicts an exemplary process that applicants have found may increase the life expectancy of the DCC fill solenoids in drink dispensing devices by activating the fill solenoids less often. Other methods may be envisioned by those skilled in the art without deviating from the concept of the inventions disclosed herein. The process 500 may be running throughout the uptime of the device, or it may be beneficial in some cases to run it intermittently, or to only run it upon the actualization of certain conditions. The process 500 used in this exemplary embodiment to increase the life expectancy of the fill solenoid will be to broaden the pressure range allowed in the barrel for a time if the fill solenoid is activating too frequently. This will allow the fill solenoid to activate less frequently until conditions stabilize. Then the pressure range will be gradually reduced back to the optimal range.

The process 500 will start 510 with the system initializing certain process variables that will be utilized in the process 500. This process 500 evaluates the number of times that the fill solenoid is activated over certain time periods, so the variables may include fill timers such as a minimum fill timer, and a maximum fill timer. Both of these timers may be measured in seconds or minutes, but other measures may be utilized such as microprocessor or microcontroller clock cycles.

The optimal pressure range of the barrel will have an optimal low pressure point, and an optimal high pressure point, and a midpoint. As described previously, the fill process 430 may be utilized to keep the pressure within this range.

Processing will move to step 515 to determine if the fill solenoid had been activated. This may have occurred because the fill minimum timer had expired, or it may have occurred for some other process activity such as if the barrel state had changed from defrost to idle, or from idle to cooling. Other conditions that may activate this step 515 may include a change in the pressure in the barrel, a change in the pressure of the DCC, or the dispensing of a drink.

If the fill solenoid had been activated in step 515, processing moves to step 540, where it is determined how many times the fill solenoid had been activated during a timer period. If this is less than some established number then processing will move to step 590 which will be described later. However, if the fill solenoid had been activated too frequently during the maximum fill timer period then process will move to step 545. As an example, it may be determined that the optimal number of times that the fill solenoid be activated be 5 times per 60 minute period. If it is activated less often than that, then the solenoid will last for at least some known number of years. However, if during a single 60 minute period the solenoid is activated 7 times then appropriate action may be taken so that the solenoid will not wear out before that life expectancy.

Step 545 is performed if the fill solenoid has been activated more than a set number of times within a specified time period. The fill setpoints will be broadened which may entail lowering the pressure at which the fill process starts, and raising the pressure at which the fill process stops. The broadening of the fill pressure limits may be done in steps. For example, if the optimal low pressure is 28 psig and the optimal pressure midpoint is 30 psig, and a step is 2 psi, then a step of broadening would result in the fill process activating at 26 psig and the process stopping when the pressure becomes 32 psig. If all other conditions remain about the same this broadening of the pressure range will allow the fill solenoid to activate less frequently.

As noted elsewhere, care must be taken that this method of broadening the fill range does not impinge upon the vent process. That is to say that the upper pressure setpoint for the fill process must not overlap the low pressure setpoint of the vent process regardless of how either are broadened.

In another envisioned embodiment of the inventions described herein, broadening the fill setpoints may be done by only lowering the setting at which the fill process activates. This may be done to ensure that the fill cycle does not bring the pressure in the barrel too close to the pressure that would activate a vent cycle. Continuing the above example, if a broadening step occurs when optimal low pressure is 28 psig and the optimal pressure midpoint is 30 psig then the fill process would be activated at 26 psig, but the target pressure at which the fill process would be stopped would remain at 30 psig.

Steps 550 and 555 are performed to ensure that broadening the fill pressure does not exceed the pressures established for the maximum high pressure point and the minimum low pressure point. Continuing the above example, if a minimum lower pressure point were established at 24 psig, reiterating steps 515, 540, and 550 a number of times could lower the pressure that activates a fill to a pressure lower than 24 psig. Steps 550 and 555 prevent that from happening and act to keep the pressure in the barrel at an acceptable pressure level.

Referring back to step 515, if the solenoid has not been activated, processing moves to step 520 where it is determined if the number of times that the fill solenoid has been activated is equal to, less than, or greater than some number within the minimum fill timer time period. If it is a greater number than established, then processing will continue to step 590, which is discussed below. However, if the number is less than or equal to an established number for the minimum fill timer period, then processing proceeds to step 525.

Step 520 may be considered to be the inverted case of step 540. In this, rather than taking an action if the fill solenoid has been activated too often in a time period as is done in step 540, step 520 will take action if the fill solenoid has been activated too infrequently within a time period. The objective of this step is to return the system as quickly as possible to the optimum pressure range to produce the highest quality product. If the conditions for broadening the pressure range are no longer in effect, actions will be taken to narrow the pressure range in a fill cycle. As an example, if the pressure had been previously broadened such that the pressure at which a fill were to start and end had been established at 26 and 32 psig respectively, and the fill solenoid had only been activated once in a 60 minute period, then the start and end pressures will be narrowed in step 525 such that the start pressure is 28 psig and the stop pressure is 30 psig.

Similar to the broadening steps of 550 and 555, narrowing steps 530 and 535 prevent changing the fill activation pressure to a pressure below an established minimum, and also prevent changing the fill stop pressure to a pressure greater than an established maximum. Continuing the above example, if the pressure to activate a fill cycle is set at 24 psig and that is the lowest point established to allow a fill, steps 530 and 535 will prevent the process from moving that pressure below 24 psig. In one of many envisioned embodiments of the inventions described herein, it may be that the drink quality suffers and becomes less than desirable if the pressure in the barrel becomes less than some minimum. In another of many such embodiments, it may be that a pressure above a certain threshold will expel a frozen beverage out the dispensing path with too great force causing splattering or other undesirable effects. In both of these envisioned embodiments, process steps 530 and 535, and steps 550 and 555 will keep the pressure in the barrel to within the acceptable pressure range.

Step 590 is the end of the processing for method 500. If method 500 is continuously miming during the uptime of the frozen beverage dispensing device, then processing will return to step 515. One of three results may be realized from processing each iteration of method 500: the fill pressure limits will be broadened, the fill pressure limits will be narrowed, or the fill pressure limits will be unchanged.

Figure 6:
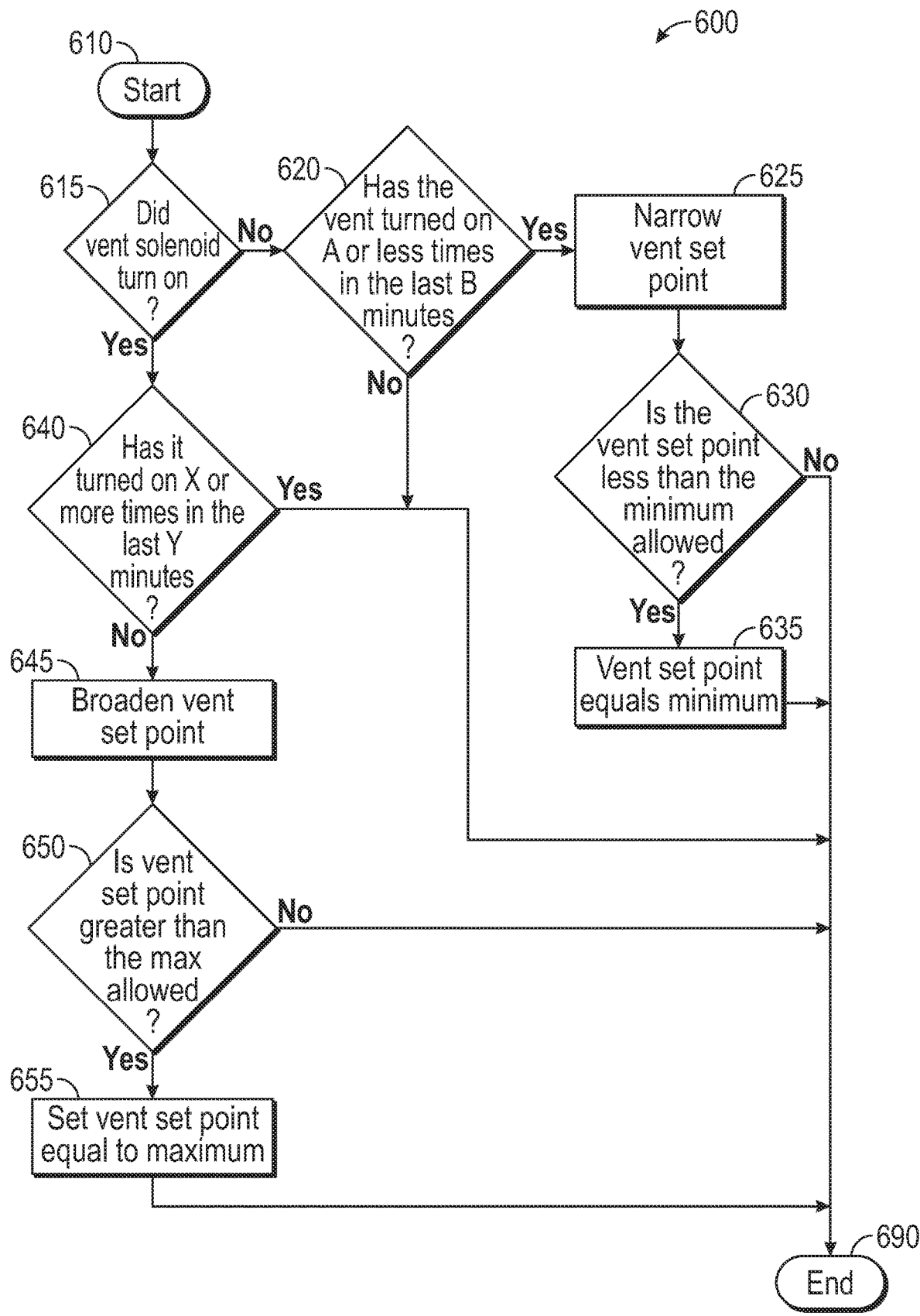
FIG. 6 is a flow diagram illustrating exemplary steps used in the vent control of a dynamic charge system in accordance with certain teachings of the present disclosure.

FIG. 6 depicts an exemplary process that applicants have found may increase the life expectancy of the DCC vent solenoids in drink dispensing devices by activating the vent solenoids less often. Other methods may be envisioned by those skilled in the art without deviating from the concept of the invention disclosed herein. The process 600 may be running throughout the uptime of the device, or it may be beneficial in some cases to run it intermittently, or to only run it upon the actualization of certain conditions. The process 600 used in this exemplary embodiment to increase the life expectancy of the vent solenoid will be to broaden the pressure range allowed in the barrel for a time if the vent solenoid is activating too frequently. This will allow the vent solenoid to activate less frequently until conditions stabilize. Then the pressure range will be gradually reduced back to the optimal range.

The process 600 will start 610 with the system initializing certain process variables that will be utilized in the process 600. This process 600 evaluates the number of times that the vent solenoid is activated over certain time periods, so the variables may include vent timers such as a minimum vent timer, and a maximum vent timer. Both of these timers may be measured in seconds or minutes, but other measures may be utilized such as microprocessor clock cycles.

The optimal pressure range of the barrel will have an optimal low pressure point, and an optimal high pressure point, and a midpoint. As described previously, the vent process 450 may be utilized to keep the pressure within this range.

Processing will move to step 615 to determine if the vent solenoid had been activated. This may have occurred because the vent minimum timer had expired, or it may have occurred for some other process activity such as if the barrel 18 state had changed from defrost to idle, or from idle to cooling. Other conditions that may activate this step 615 may include a change in the pressure in the barrel, a change in pressure in the DCC, or the dispensing of a drink.

If the vent solenoid had been activated in step 615, processing moves to step 640 where it is determined how many times the vent solenoid had been activated during a timer period. If this is less than some established number then processing will move to step 690 which will be described later. However, if the vent solenoid had been activated too frequently during the maximum vent timer period then process will move to step 645. As an example, it may be determined that the optimal number of times that the vent solenoid be activated be 5 times per 60 minute period. If it is activated less often than that, then the solenoid will last for at least some known number of years. However, if during a single 60 minute period the solenoid is activated 7 times then appropriate action may be taken so that the solenoid will not wear out before that life expectancy.

Step 645 is performed if the vent solenoid has been activated more than a set number of times within a specified time period. The vent setpoints will be broadened which may entail raising the pressure at which the vent process starts and lowering the pressure at which the vent process stops. The broadening of the vent pressure limits may be done in steps. For example, if the optimal high pressure is 32 psig and the optimal pressure midpoint is 30 psig, and a step is 2 psi, then a step of broadening would result in the vent process activating at 34 psig and the process stopping when the pressure becomes 28 psig. If all other conditions remain about the same this broadening of the pressure range will allow the vent solenoid to activate less frequently.

As noted elsewhere, care must be taken that this method of broadening the vent range does not impinge upon the fill process. That is to say that the lower pressure setpoint for the vent process must not overlap the high pressure setpoint of the fill process regardless of how either are broadened.

In another envisioned embodiment of the inventions described herein, broadening the vent setpoints may be done by only raising the setting at which the vent process activates. This may be done to ensure that the vent cycle does not bring the pressure in the barrel too close to the pressure that would activate a fill cycle. Continuing the above example, if a broadening step occurs when optimal high pressure is 32 psig and the optimal pressure midpoint is 30 psig then the vent process would be activated at 34 psig, but the pressure at which the vent process would be stopped would remain at 30 psig.

Steps 650 and 655 are performed to ensure that broadening the vent pressure does not exceed the pressures established for the maximum high pressure point and the minimum low pressure point. Continuing the above example, if a maximum high pressure point were established at 36 psig, reiterating steps 615, 640, and 650 a number of times could raise the pressure that activates a vent to a pressure higher than 36 psig. Steps 650 and 655 prevent that from happening and act to keep the pressure in the barrel at an acceptable pressure level.

Referring back to step 615 if the solenoid has not been activated, processing moves to step 620 where it is determined if the number of times that the vent solenoid has been activated is equal to or less than, or greater than some number within the minimum vent timer time period. If it is a greater number than established, then processing will continue to step 690, which is discussed below. However, if the number is less than or equal to an established number for the minimum vent timer period, then processing proceeds to step 625.

Step 620 may be considered to be the inverted case of step 640. In this, rather than taking an action if the vent solenoid has been activated too often in a time period as is done in step 640, step 620 will take action if the vent solenoid has been activated too infrequently within a time period. The objective of this step is to return the system as quickly as possible to the optimum pressure range to produce the highest quality product. If the conditions for broadening the pressure range are no longer in effect, actions will be taken to narrow the pressure range in a vent cycle. As an example, if the pressure had been previously broadened such that the pressure at which a vent were to start and end had been established at 34 and 28 psig respectively, and the vent solenoid had only been activated once in a 60 minute period, then the start and end pressures will be narrowed in step 625 such that the start pressure is 32 psig and the stop pressure is 30 psig.

Similar to the broadening steps of 650 and 655, narrowing steps 630 and 635 prevent changing the vent activation pressure to a pressure above an established maximum, and also prevent changing the vent stop pressure to a pressure less than an established minimum. Continuing the above example, if the pressure to activate a vent cycle is set at 36 psig and that is the highest point established to allow a vent, steps 630 and 635 will prevent the process from moving that pressure above 36 psig. In one of many envisioned embodiments of the inventions described herein, it may be that the drink quality suffers and becomes less than desirable if the pressure in the barrel becomes greater than some maximum. In another of many such embodiments, it may be that a pressure below a certain threshold will not propel a frozen beverage out the dispensing path with enough force causing a consumer to wait an inordinate amount of time. In both of these envisioned embodiments, process steps 630 and 635, and steps 650 and 655 will keep the pressure in the barrel to within the acceptable pressure range.

Step 690 is the end of the processing for method 600. If method 600 is continuously miming during the uptime of the frozen beverage dispensing device, then processing will return to step 615. One of three results may be realized from processing each iteration of method 600: the vent pressure limits will be broadened, the vent pressure limits will be narrowed, or the vent pressure limits will be unchanged.

Figure 7:
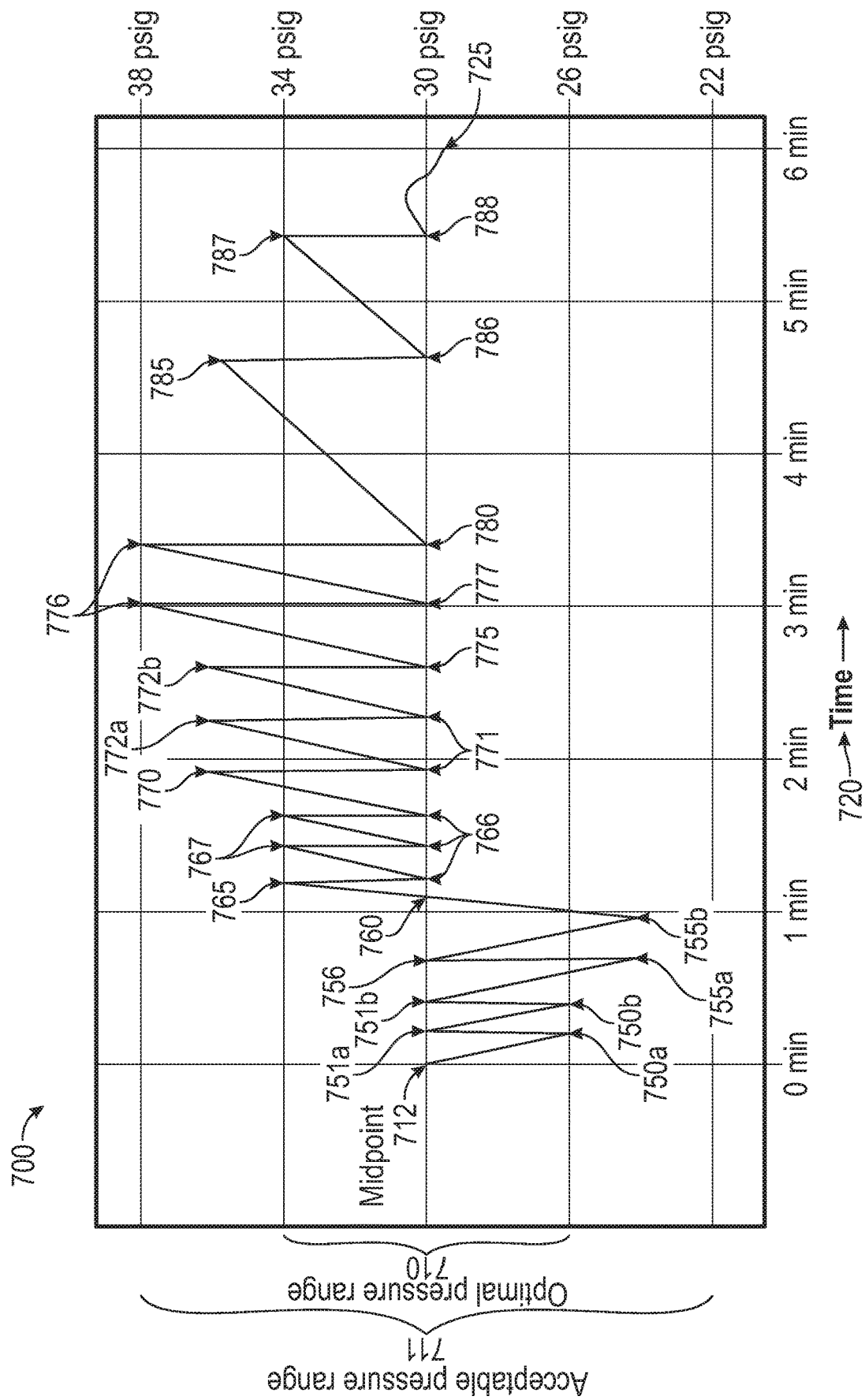
FIG. 7 is a chart showing a timeline of fill and vent cycles in an exemplary frozen beverage dispenser in accordance with certain teachings of the present disclosure.

FIG. 7 depicts a chart 700 of the pressure of a DCC system and barrel over a period of time of an exemplary frozen beverage dispensing device utilizing an embodiment of the inventions disclosed in FIGS. 5 and 6. In this exemplary chart 700, an optimal pressure range 710 is depicted as being between 26 psig and 34 psig with a midpoint 712 at 30 psig. An acceptable pressure range 711 has also been defined as being between 22 psig and 38 psig. For convenience of this explanation, the time 720 will start at an arbitrary point of 0 minutes and is scaled in 1 minute increments. For this example, the pressure 725 of the DCC system will start at just above the midpoint 712.

At 0 minutes in chart 700, the pressure 725 falls rapidly. This may be from a drink or multiple drinks being dispensed where the refill of solution has not adjusted the pressure back to the optimal range. The fill process 430 starts at points 750*a* and 750*b* when the pressure 725 reaches the low point of the optimal pressure range 710. Gas medium is injected into the expansion tank until the pressure 725 reaches points 751*a* and 751*b* at the midpoint 712 where the fill process 430 stops.

During the fill between points 750*b* and 751*b*, the process 500 makes a decision based upon steps 515, 540, and 545 to broaden the fill range by a pressure step of 2 psi. This is outside the optimal pressure range 710 but still within the acceptable pressure range 711. The result of this decision is that the fill activation point is broadened to now be set at 24 psig. If other conditions remain somewhat stable, this will allow more time between the fill processes allowing the fill solenoid to activate less often. When the pressure does drops to 24 psig at point 755*a*, the fill process activates until the pressure reaches the midpoint 712 at point 756. Again, the pressure falls and the fill process is activated at 755*b* until the pressure reaches the midpoint 760.

Even though the pressure after point 760 does not drop, the process 500 continues to monitor the activation of the fill solenoid for some period of time. Steps 515, 520, and 525 will narrow the fill parameters so that the next fill point will again be at 26 psig, which is the low end of the optimal pressure range 710.

The pressure 725 continues to increase until it reaches the upper limit of the optimal pressure range 710 at point 765, which initiates the vent process 450. Venting will drop the pressure 725 until the pressure reaches the midpoint 712 at point 766 at which time venting will stop. By going through vent cycles 766 and 767, process 600 will be activated which will broaden the pressure at which the vent process will start from 34 psig up to 36 psig. The broadened vent cycle will start at point 770 and will continue through cycles 771 and 772*a* and 772*b*. At point 775, process 600 determines in steps 615, 640, and 645 that the vent solenoid is still activating too often so it again broadens the vent range so that venting will not start until the pressure 725 reaches 38 psig.

The broadened vent cycle is seen in cycles 776 and 777. If the rapidity of vent cycles were to continue after this, process steps 615, 640, and 645 would not be allowed to expand the vent pressure limit because the maximum acceptable pressure range 711 has been reached. Process steps 650 and 655 limit the maximum vent start pressure to the maximum acceptable pressure range 711.

After point 780, the change in the pressure 725 in the barrel slows. This allows process 600 steps 615, 620, and 625 to narrow the vent pressure range back to 36 psig. When the pressure 725 reaches 36 psig at point 785, the vent process 450 starts, and stops when the pressure 725 reaches the midpoint 712 at point 786. The pressure 725 rise is still slow after point 786 allowing process 600 steps 615, 620, and 625 to again narrow the vent pressure range so that the vent cycle will start at 34 psig as seen at point 787. Venting will continue until the pressure 725 reaches the midpoint 712 again.

The basic dynamics of broadening and narrowing the vent and fill pressure limits have been described in this disclosure and exemplified in timeline 700. Many other embodiments of the inventive concepts described may be envisioned without departing from the spirit of the disclosures contained herein. A further review of the exemplary timeline 700 may be used to recount the uses of the timers previously described as the minimum fill timer, the maximum fill timer, the minimum vent timer, and the maximum vent timer, and of setpoints. As noted previously, setpoints may be fixed setpoints, or dynamic setpoints that are reactive to identified conditions.

In the simplest case, values may be assigned to these timer variables at initialization and be static throughout the uptime of the frozen beverage dispenser. Inventors have performed this demonstration with results that identify that the goals of extending the lifetimes of the fill and vent solenoids are achievable.

If static assignments of timer variables were done in exemplary timeline 700, the timer used in the decision to broaden the vent limits from point 760 through the end of the cycles 766 would be applied indiscriminately to the cycles 770 through 775. However, this does not always need to be the case. In some situations, it may be beneficial to have different timers for different states, or timers that are reflective of different conditions. It may be noted that the vent cycles starting at point 760 and going through points 766 take about thirty seconds, but the cycles of the first vent broadening step of points 770 through 775 take about a minute before the decision is made to broaden the vent pressure cycles a second step, which starts at point 775. Extending the maximum vent timer in this way may be the product of an influence of another process going on in the frozen beverage dispenser, or from a heuristic anticipation of another upcoming event.

In one envisioned embodiment, applying a longer timer to the broadening function, and a shorter timer to the narrowing function will result in a bias towards returning the pressure limitations towards the optimum pressure range sooner. This may tend to reduce the lifetime expectancy of the solenoids but will more frequently produce a frozen beverage within optimal conditions.

Another method for making a decision about broadening or narrowing a pressure range is by looking at the history of vent and fill operations. It may be beneficial to look back over a series of vent or fill operations to see if the time periods between them is contracting or expanding. If it is contracting, within a reasonable number of operations, it may be worth broadening the range. On the other hand, if the frequency of operations is expanding, then the range should be broadened. Also, without deviating from the inventive concepts disclosed herein, other methods of referring back to prior operations may be utilized such as exponential decay averaging, or other methods of weighting a simple moving average.

As mentioned previously, other factors may influence the decision process of broadening or narrowing the ranges of the fill and vent parameters. In one of many envisioned embodiments, a single DCC system may control a beverage dispensing device with multiple barrels. In that case, the DCC will be controlling all of the barrels together and may find a situation where it is advantageous in extending the working lives of the solenoids to delay a vent or fill operation if one barrel is freezing and another is about to fill, or vice-versa. Other situations may also be envisioned by those skilled in the art without deviating from the inventions disclosed herein.

Figure 8:
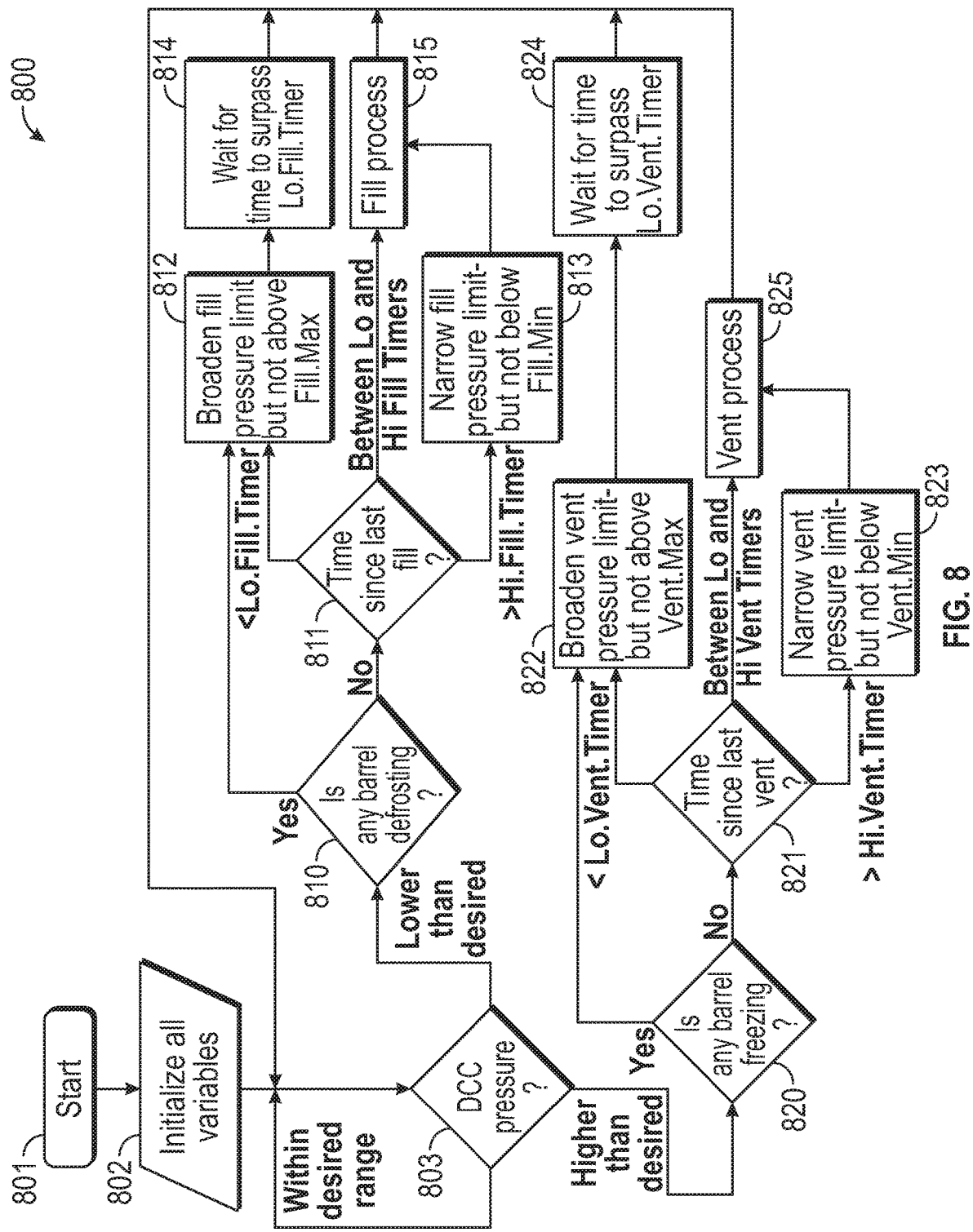
FIG. 8 is a flow diagram illustrating exemplary alternative steps used in the fill and vent controls of a dynamic charge system in accordance with certain teachings of the present disclosure.

FIG. 8 displays a flow chart 800 that may be utilized in an alternative embodiment that considers the state of the barrel in making decisions about venting or filling. As noted before, if the process is designed to continually run during the uptime of the frozen beverage dispenser, then there will be a continuous loop rather than an end to the process; that is what is depicted in flow chart 800, but other embodiments may be envisioned without departing from the inventions disclosed herein. The process will start 801 and initialize all variables and timers needed for this operation in step 802. The concepts of an optimal pressure range and an acceptable pressure range described previously will be applied in this envisioned embodiment.

The first operational step will be to evaluate the pressure of the DCC as shown in step 803. If the pressure is within the desired range, processing will loop back to step 803. This loop may include an optional period of waiting (not shown) before returning to step 803.

If step 803 finds that the DCC pressure is lower than desired, processing moves to step 810 to determine if any barrel is defrosting. If any barrel is defrosting, processing moves to step 812 where the pressure will be broadened, but not past the upper pressure limit of the acceptable pressure range described in flow chart 800 as Fill.Max. Processing will then move to step 814, which will wait for the low fill timer, denoted as Lo.Fill.Timer, to expire. Once this wait step 814 has expired, processing will be returned to step 803 to measure the pressure of the DCC again.

Returning to step 810, if it is determined that no barrels are currently defrosting, processing will move to step 811 where the time since the last fill operation will be compared against the fill timers. If the time since the last fill operation is between the low fill timer and the high fill timer, the fill process will be performed in step 815. When that is completed, processing will be returned to step 803.

Returning to step 811, if the time since the last fill operation is less than the low fill timer, processing will be moved to step 812, 814, and subsequently 803 as described previously. This path will be followed because the fill operation is being performed too frequently. Broadening the fill pressure limits in step 812 will allow the pressure to build more before the fill solenoid is activated to be closed, and will allow the pressure to drop more before the fill solenoid is activated to open. Step 814 is a delay to wait for the low fill timer to expire so that processing does not immediately move back through steps 803, 810, 811, and subsequently 812 to again broaden the fill pressure range too quickly.

Returning to step 811, if the time since the last fill operation is greater than the high fill timer, denoted as Hi.Fill.Timer, then processing will be moved to step 813 where the fill pressure range will be narrowed, but not below the optimal fill pressure range, denoted as Fill.Min. This is because the fill operations are temporally spaced apart and it may be better in this exemplary embodiment to keep the frozen beverage within the optimal range, rather than the acceptable range, even though the fill solenoid will be activated more often. Once step 813 is completed, processing moves to step 815 for the actual fill.

Returning to step 803, if the pressure is higher than desired, vent operations and decisions are made in a manner somewhat similar to those described in the fill operations above.

Figure 9:
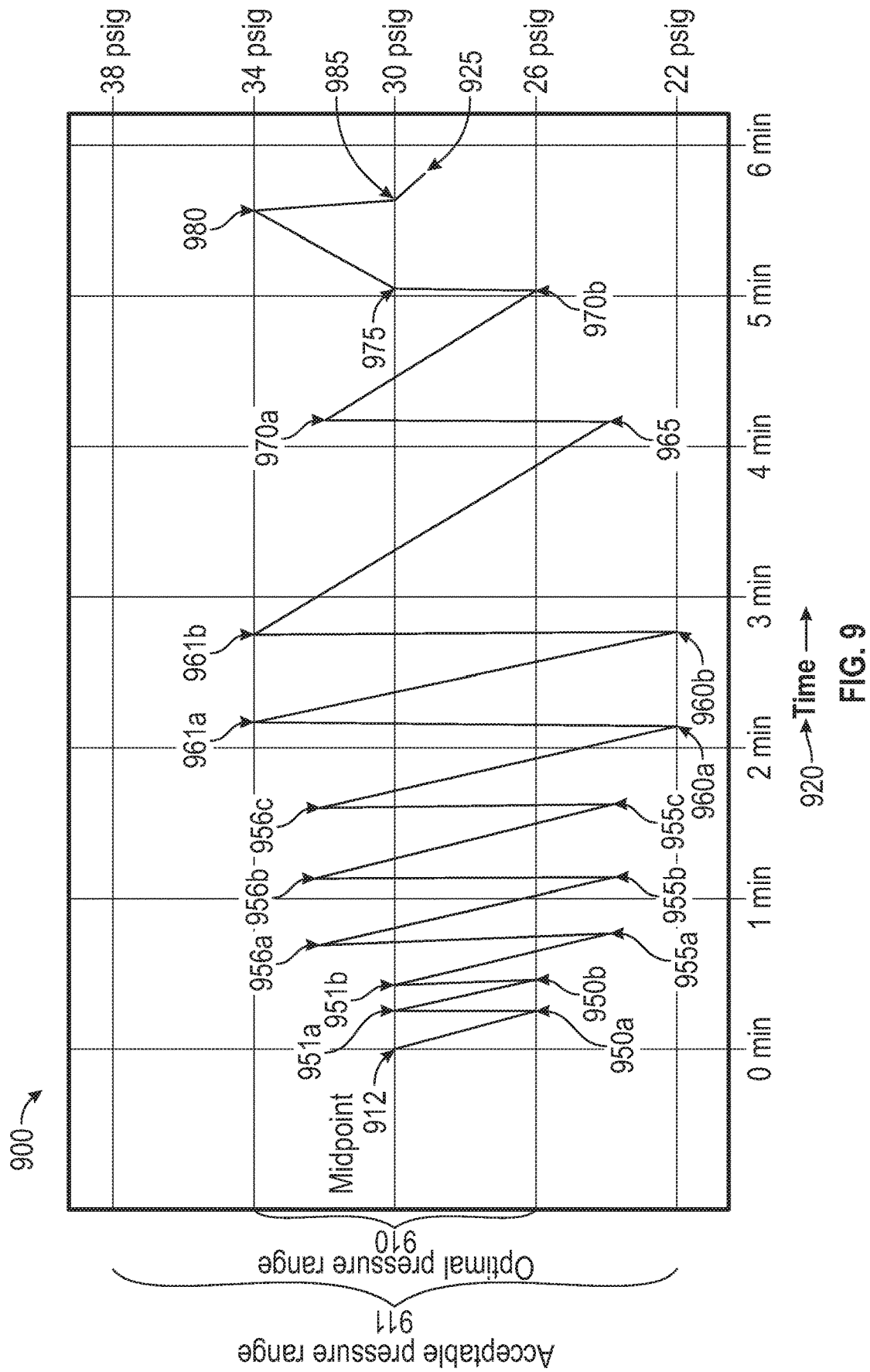
FIG. 9 is a chart showing a timeline of fill and vent cycles in an exemplary frozen beverage dispenser in accordance with certain teachings of the present disclosure.

FIG. 9 depicts a chart 900 of the pressure of a DCC system and barrel over a period of time of an exemplary frozen beverage dispensing device utilizing an embodiment of the inventions disclosed herein. In this exemplary chart 900, an optimal pressure range 910 is depicted as being between 26 psig and 34 psig with a midpoint 912 at 30 psig. An acceptable pressure range 911 has also been defined as being between 22 psig and 38 psig. For convenience of this explanation, the time 920 will start at an arbitrary point of 0 minutes and is scaled in 1 minute increments. For this example, the pressure 925 of the DCC system will start at just below the midpoint 912.

At 0 minutes in chart 900, the pressure 925 falls rapidly. This may be from a drink or multiple drinks being dispensed where the refill of solution has not adjusted the pressure back to the optimal range. The fill process 430 starts at points 950a and 950b when the pressure 925 reaches the low point of the optimal pressure range 910. Gas medium is injected into the expansion tank until the pressure 925 reaches points 951a and 951b at the midpoint 912 where the fill process 430 stops. After point 951b, the rapidity of fill cycles has caused the process to broaden the fill pressure range. The new fill high pressure is 32 psig, which is above the midpoint 912, and the new fill low pressure is 24 psig. Subsequently when the pressure drops to 24 PSIG at point 955a, the fill process starts and operates until the pressure reaches 32 psig at point 956a.

Again, the rapidity of the fill cycles causes the fill range to be broadened at point 956c, setting a new low fill pressure of 22 psig, and a new high fill pressure of 34 psig. It should be noted here that a pressure of 34 psig would normally start the vent process. However, this is forestalled in this embodiment because the controller has kept a history of the pressure in the barrel and expects that the pressure will again decrease after the fill process reaches a pressure at point 961a, which is at the top of the optimal pressure range. If the pressure does not start to drop soon after reaching that point, the controller should sense that the pressure is not behaving per expectations and may elect to start the vent process within the most narrow range. Also, if this happens, the fill range may be narrowed to its narrowest range.

The system continues to use the broadest fill range possible in this example until point 961b. After that, it may be seen that the slope of the pressure drop has lessened, which may indicate that the barrel is no longer freezing. The time period that this continues over is sufficient to narrow the fill range starting at point 965. The depletion of pressure between points 970a and 970b is again sufficient to narrow the fill range so that the pressure 925 is only increased to 30 psig, the midpoint 912, at point 975. At that point, it is seen that the pressure increased to point 980 where the vent cycle is started. The vent cycle is stopped at point 985 when the pressure reaches 30 psig, again at the midpoint 912.

Modifications may be made to the concepts disclosed herein without departing from the concepts of the inventions described. Also, the inventions disclosed herein may be combined to produce methods for maintaining the product in the freezing chamber at optimal conditions while minimizing the frequency of use of the solenoids of the DCC. In one of many possible modifications, rather than broadening or narrowing a vent or fill setpoint, the midpoint may be altered for some periods of time. Referring back to FIGS. 5, 6, and 7, a decision is made between points 750b and 751b to broaden the fixed setpoint range. An alternative method of achieving a desirable result may be to change the midpoint, and to establish a dynamic setpoint range. A different set of calculations may be made of when to fill. One result of this modification may be that the fill and vent setpoints may be the same as those shown at points 755a, 756, and 755b. Another possible result may be that the fill points 755a and 755b would be the same as in FIG. 7, but that the vent point 756 would be changed; either raised or lowered depending upon the desired characteristics of the drink to be dispensed and the conditions of the barrel at that time.

Another of the many possible modifications that may be made to the inventions disclosed herein may be to calculate fill and vent setpoints based upon some variable or variables, rather than using broadening or narrowing values with static setpoint ranges. In the example given in FIG. 7, static values were used. However, rather than using those static values, it may be preferable to use a dynamic setpoint range based upon a percentage of the current setpoint, or upon some other factor.

As was noted earlier, the pressure conditions in the barrel 218 may not be immediately reflected in the expansion tank 225. However, applicants have found that they may anticipate these pressure conditions under different circumstances, and have been able to maintain a more consistent desirable drink quality in the barrel by making predictions based upon the circumstances. These predictions have been used to make changes to the pressure in the expansion chamber 225 that will more closely match the desired pressures in the freezing chamber 218.

A drink that is preferred to be dispensed at a pressure of 27 psig in the barrel 218 may be used as an example of the inventions disclosed herein. From the varying operational characteristics of dispensing, filling, freezing, defrosting, etc., it may be desirable to maintain a pressure within the barrel 218 of between 26.5 and 27.5 psig. Applicants have found that for some beverages, it is preferable to operate the active charge pressure inside the expansion tank 225 as close as possible to the freezing chamber's fill pressure, but with an additional offset above the high pressure of the chamber 218. With certain frozen carbonated beverages, Applicants have found that an optimal offset is 0.5 psi. Therefore, the desired pressure of the expansion tank will be set to 28 psig (27.5 psig+0.5 psi). As described earlier an initial step range for the fill and vent setpoints may be set at 0.5 psi for this example.

When the freezing barrel 218 is operating normally, the active charge pressure in the expansion chamber 225 will be kept near 28 psig by venting at a pressure of 30 psig (28 psig+2 psi), and will fill the expansion tank 225 when the pressure reaches 28 psig.

Under these conditions, applicants have found that the pressure in the barrel 218 has been kept within the desired range. However, when the barrel undergoes freezing or defrosting, the conditions change and some changes may be made to the vent and fill setpoints in the expansion tank 225.

In the case where the barrel 218 is defrosting, the fill setpoint may be kept at 28 psig, but the vent setpoint may be increased by 1 psi to 31 psig. The fill and vent operations will not attempt to keep the pressure in the expansion tank at a midpoint, as was described in FIGS. 5, 6 and 7, but instead each will stop at a target pressure. During the defrost operation, the target may be expressed as the sum of the fill setpoint (28 psig) plus the difference between the vent setpoint and the fill setpoint, multiplied by a factor. The difference between the vent and fill setpoints is 31-28 psig, and an effective factor that has been found through experimentation is 0.75. From that, the fill and vent operations will cease when the pressure in the expansion chamber 225 reaches 28+(31−28)*0.75=30.25 psig.

For the case where the barrel 218 is freezing, the same fill and vent setpoints have been found to be effective in maintaining the desired pressure in the barrel 218, but a different target pressure has been found to be effective. This target may be expressed as the sum of the fill setpoint (28 psig) plus the difference between the vent setpoint and the fill setpoint, multiplied by another factor. The difference between the vent and fill setpoints is 31-28 psig, and an effective factor that has been found through experimentation is 0.25. From that, the fill and vent operations will cease when the pressure in the expansion chamber 225 reaches 28+(31−28)*0.25=28.75 psig.

Applicants have found that utilizing dynamic fill and vent setpoints in the expansion tank 225, along with a target pressure for fill and vent operations has produced results of maintaining a desirable pressure range within the freezing barrel 218 of an exemplary apparatus. The incorporation of the processes shown in FIGS. 8 and 9 has been shown to be useful to keep the fill and vent solenoids from activating more frequently than desired. Following through this this example, if the solenoids are activating too often, the range for the vent setpoint may be increased by 0.5 psi so that the vent setpoint becomes 30.5 psig. The target pressure during a defrost will become 28+(30.5−28)*0.75=29.875 psig, and the target pressure during a freeze will become 28+(30.5−28)*0.25=28.625 psig. Over time, as the solenoids are activated less often, the fill and vent setpoints may be narrowed back to their optimum values.

Applicants have found the described setpoints, offsets, and factors described in the exemplary embodiment above are effective for frozen carbonated beverages. However, the concepts described herein are applicable to all types of beverages with setpoints, offsets, and factors applicable to other types of beverages.

The intelligent control of the solenoids described herein enables additional features in a frozen beverage dispensing machine. One such additional feature is the ability to change the pressure in the barrel based upon the specifications for a specific drink, or based upon the preferences of a consumer. If the gas used in a drink is carbon dioxide, then the level of carbonation and thus the amount that the gas expands the frozen beverage may be selected. In one of many possible embodiments, this may be described in that the DCC establishes and maintains an optimal pressure range for the drink in the barrel. When a customer approaches the frozen beverage dispensing machine and selects a drink, or a preference for the drink to be dispensed, the DCC regulates the pressure in the barrel to meet the selection before dispensing the drink.

Figure 10:
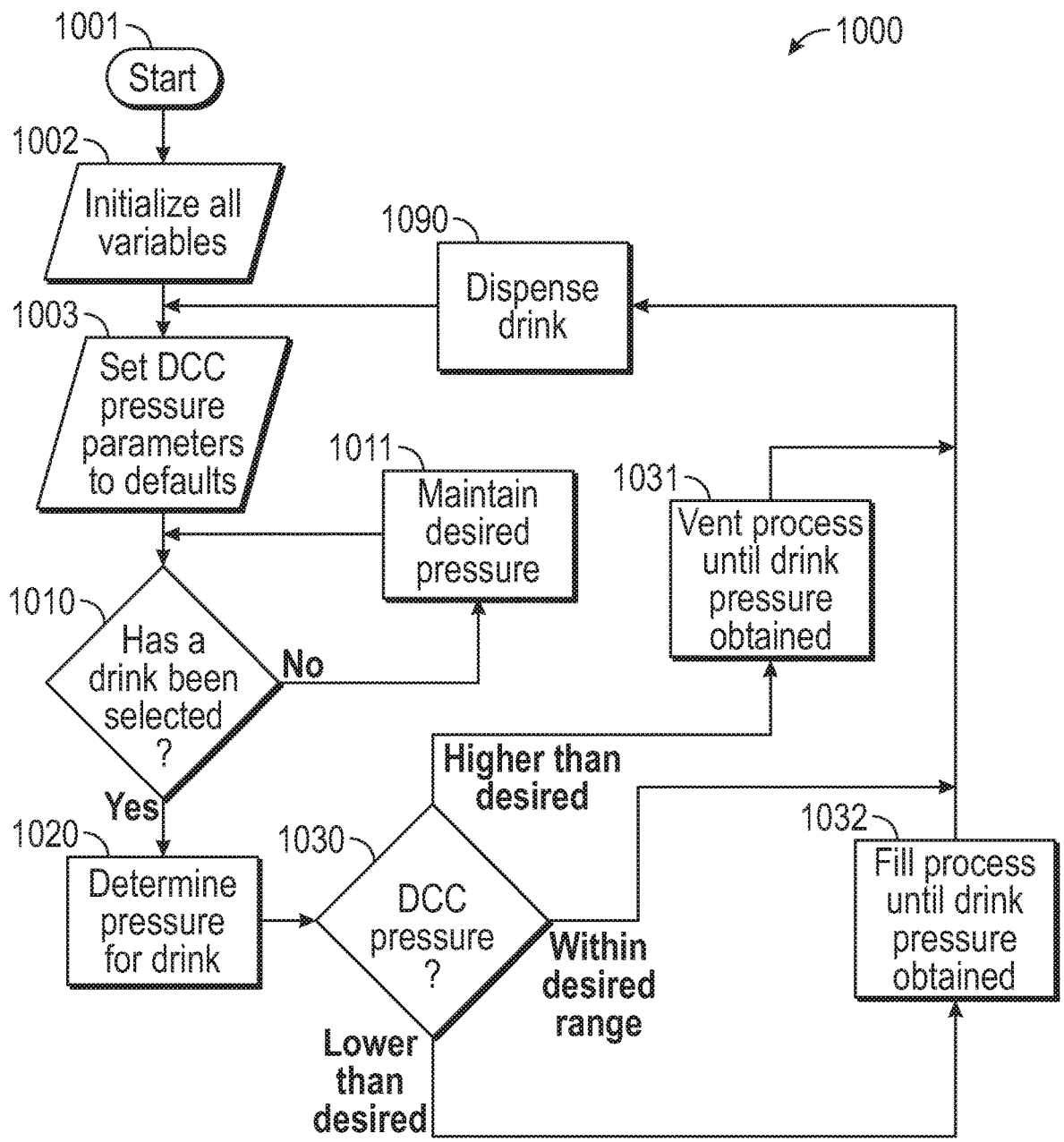
FIG. 10 is a flow diagram illustrating exemplary steps used in the control of pressure during the selection and dispensing of a drink in an exemplary dynamic charge system in accordance with certain teachings of the present disclosure.

One of many possible methods of changing the pressure parameters for a selected drink is exemplified in FIG. 10. This process 1000 is shown in a manner in which it is started when the frozen beverage dispenser is started, and continues throughout the uptime of the device. Others sufficiently skilled in the art will be able to envision other methods that are still within the scope of the inventions disclosed herein. The process 1000 is started at step 1001 and all variables and timers are initialized in step 1002. As has been described previously, a range of pressures may be established for starting and stopping the vent and fill cycles, which may be the optimal pressure for a type of drink being held in the barrel. This pressure range is applied in step 1003 where the pressure range is set to the optimal pressure range for the beverage.

Processing then moves to step 1010, which determines if a drink has been selected. If no drink has been selected, then the device maintains the desired pressure in step 1011 and processing loops through these steps until a drink is selected. When a drink is selected, processing moves to step 1020, which determines the pressure for the selected drink. Among many possible ways, this pressure may be found through a database lookup, it may be entered by the consumer at the time of dispensing the drink, or any number of other ways.

Once the pressure for the drink has been found in step 1020, processing moves to step 1030.

Step 1030 reviews the pressure in the barrel and in the DCC. If the pressure in the barrel is higher than what is called for in the desired drink then pressure in the expansion tank is vented in step 1031. If the pressure is lower, then pressure is added through a fill operation in step 1032. At the end of steps 1031 and 1032, processing moves to step 1090. However, if the pressure is already at the desired pressure in step 1030, then processing moves to step 1090 where the drink, at the correct pressure, is dispensed.

The process 1000 may be applied to a frozen beverage dispenser with a single barrel, or with more than one barrel. In one of many possible embodiments, a single freezing barrel 218 may be associated with a single DCC. As noted earlier, the beverage to be dispensed will be based upon factors such as the composition of the beverage in the freezing chamber (fountain syrup, FCB syrup, juice, coffee, etc., water and a gas medium) and the pressure. Since different pressures used with the same ingredients may produce beverages with different characteristics, one embodiment may comprise the same ingredients going into different barrels, with the pressure of each barrel controlled by a different DCCs. In yet another embodiment, different ingredients may be going into different barrels, but the barrels are regulated by a single DCC.

In one embodiment, an apparatus that produces a beverage based upon the selection of a user may have a small freezing barrel so that pressure changes may be made rapidly and efficiently. In that case the freezing barrel may be associated with a similarly small sized expansion chamber. Applicants have noted that if the volume of the active charge system is small, and/or if the controller is not fast enough, the sequence of vent and fill cycles may oscillate. One method to counter this oscillation and to bring the apparatus back into an effectively operational state may be to limit the activation time of the vent and fill solenoids separately, or in conjunction with other processes described herein. In one exemplary embodiment, limiting the fill solenoid to be activated for only a short time may not fully pressurize the expansion chamber to a desired pressure. While this may prevent the controller from activating the vent solenoid, the freezing barrel may not be at an optimum pressure. Applicants have had success in using times of 200 milliseconds and 150 milliseconds for this operation. In such a case, the processes described herein may be utilized to stabilize the apparatus. A process similar to process 800 may be activated to broaden the fill pressure range to accommodate the current barrel pressure. From that starting point, the fill pressure range may be progressively narrowed until the system is back within normal operating conditions.

In an envisioned embodiment, the problem may also be addressed by having vent and fill solenoids with variable duty cycles, rather than utilizing solenoids with fixed orifice sizes that only actuate in off/on cycles.

Figure 11:
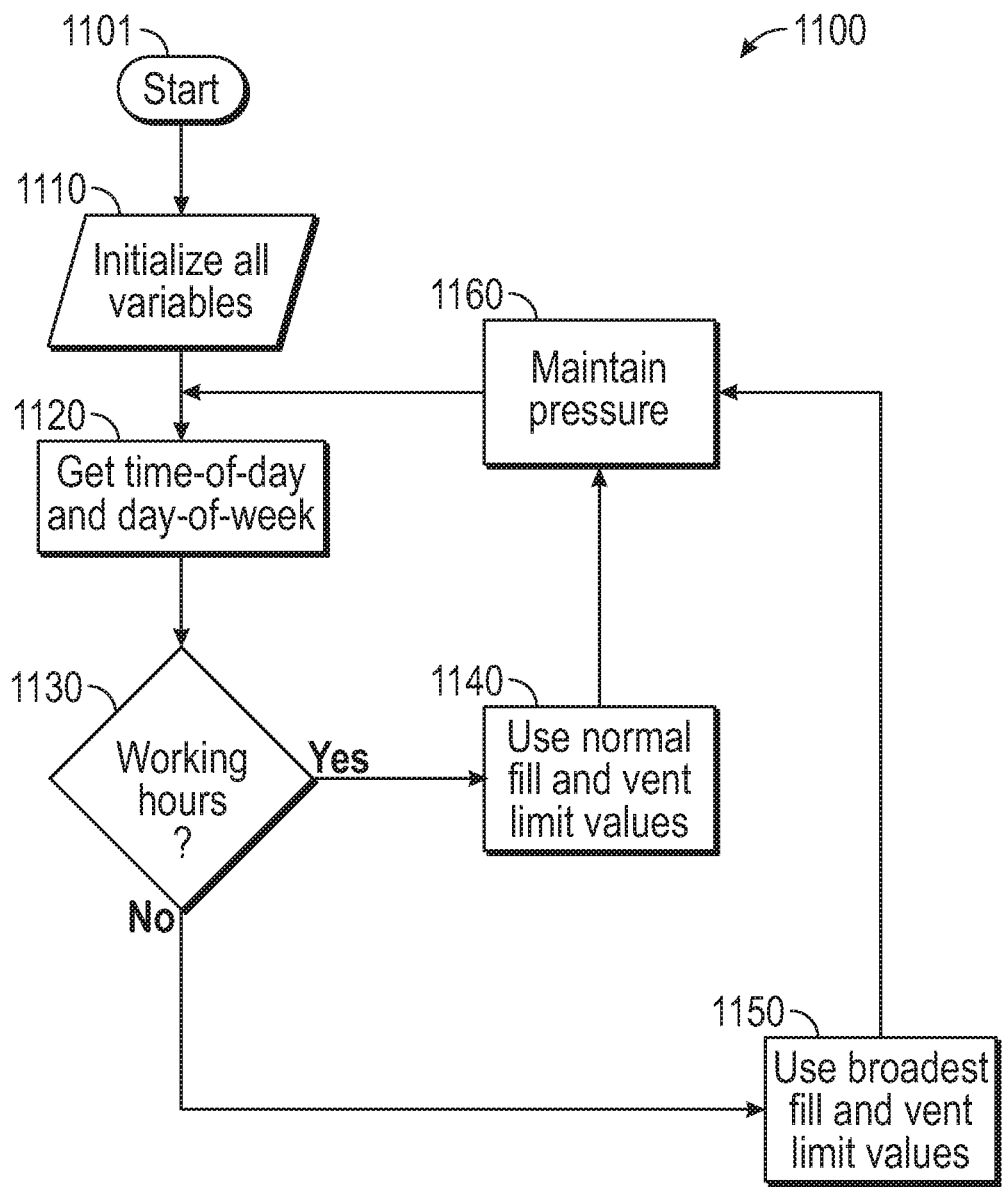
FIG. 11 is a flow chart illustrating an exemplary method for maintaining the pressure of an exemplary dynamic charge system in certain times of the day and days of the week in accordance with certain teachings of the present disclosure.

In another direction, the intelligent control of the solenoids may be useful in conserving resources while extending the useful life of the solenoids. In one of many embodiments of the inventions disclosed herein, the controller may be able to extend the useful lives of the solenoids by knowing when the device may be used. One embodiment of many possible may be seen in FIG. 11.

Process 1100 may be useful in a situation where a frozen beverage dispensing device is in a shop that is only open for certain hours during the day, but is left on continuously. This may be optimal where the owner of the machine may not want to discard unused product in the evening, and restart with fresh ingredients each morning. Instead, the device may be left on overnight and will have frozen carbonated beverages ready to dispense when the shop is opened. However, maintaining the pressure in the barrel in the aforementioned optimal pressure range may activate the vent and fill solenoids more often than if the pressure range were to be broadened to the extent of the acceptable range. Therefore, intelligently controlling the solenoids in such conditions may further extend their useful life expectancies.

Process 1100 is shown as running continuously through the uptime of the device. Those skilled in the art may find other ways to utilize and deploy the concepts embodied herein without departing from the inventions disclosed in FIG. 11 and elsewhere herein. The process 1100 starts 1101 when the device is turned on. The variables and timers are initialized in step 1110. This may include knowing when the shop is going to be open or closed, or at which times the owner of the device thinks that the device will experience very low usage. This may be input by the owner through any of a number of input processes including but not limited to a computer interface, a touchpad, a keyboard, or other means. In the vernacular, these times may be designated as working hours and non-working hours. During working hours, the device will be expected to deliver a frozen carbonated beverage at optimal conditions and without delay. Therefore, the pressure should be maintained within the optimal pressure range previously described. However, when to the shop is closed, described as non-working hours, the frozen carbonated beverage in the barrel does not need to be maintained at the optimal pressure conditions, but may be kept within the acceptable pressure range because it is not expected to dispense drinks during those hours.

Processing then moves to step 1120 where the device determines the time of day and day of week. This may also be done through any number of methods such as but not limited to the device having a network connection wherein it may obtain the time, the device having an internal clock settable by the owner, the device obtaining the time through radio signals, or other methods. Processing then moves to step 1130 where the device compares the time of day and day of week against the known working hours and non-working hours. If it determines that the time of day and day of week are within the defined working hours then processing moves to steps 1140 and 1160 which keep the pressure within the optimal fill and vent ranges, with processing looping back to step 1120. However, if step 1130 determines that it is within non-working hours, then processing moves to steps 1150 and 1160, which will broaden the fill and vent pressure ranges to their broadest settings. At these settings, the solenoids will be used much less often, which will extend their expected lives.

The concepts disclosed in this process 1100 may be utilized in other ways as well. In one of many possible embodiments, the frozen beverage device may start a timer of when a drink is last dispensed and utilize that to establish if it should broaden its pressure range. In an envisioned application of this embodiment, if no drink is dispensed within some time, perhaps 15 minutes, then the machine may elect to broaden its vent and fill pressure ranges with the intent that it may quickly narrow them when a drink is requested.

In another embodiment, a frozen beverage dispenser may be able to determine if people are nearby. If no people are nearby then it is likely that no drinks will be dispensed and the fill and vent pressure ranges may be broadened so that the solenoids are used less frequently. However, if people are nearby then the pressure ranges should be narrowed into the optimal pressure range with the expectation that it should be immediately ready to dispense a frozen beverage at optimal conditions in the eventuality that a person will request one. Beverage dispensers may acquire the knowledge that people are nearby through any number of methods including but not limited to a motion sensor, infrared detector, or signals derived from processing the video feeds of what are known as security cameras. In one envisioned embodiment, the frozen beverage dispenser may hold the pressure within the broadest acceptable range but narrow the pressure range to the optimal pressure range if the processing of the security cameras indicates that at least one person is moving towards the beverage dispensing device.

In yet another envisioned embodiment, the frozen beverage dispenser may be able to determine active hours from relatively inactive hours heuristically. In this, the frozen beverage machine may be able to maintain records of activity associated with the time of day, day of the week, calendar days throughout the year, and perhaps even holidays. The activities used for this process may be obtained through tracking the sale of drinks including but not limited to activation of a dispense valve, monitoring solution filling in the barrel, or by receiving sales data. After building a sufficient base of associations, the device would be able to extrapolate activities and would thereafter prepare itself for times when it would expect consumers to want frozen beverages. In one envisioned embodiment, the records of activities, processing, and heuristic technique may all be on the frozen beverage machine. In another envisioned embodiment, some parts of this may be retained or processed on remote devices and shared with many frozen beverage machines in similar or different geographic areas.

Figure 12:
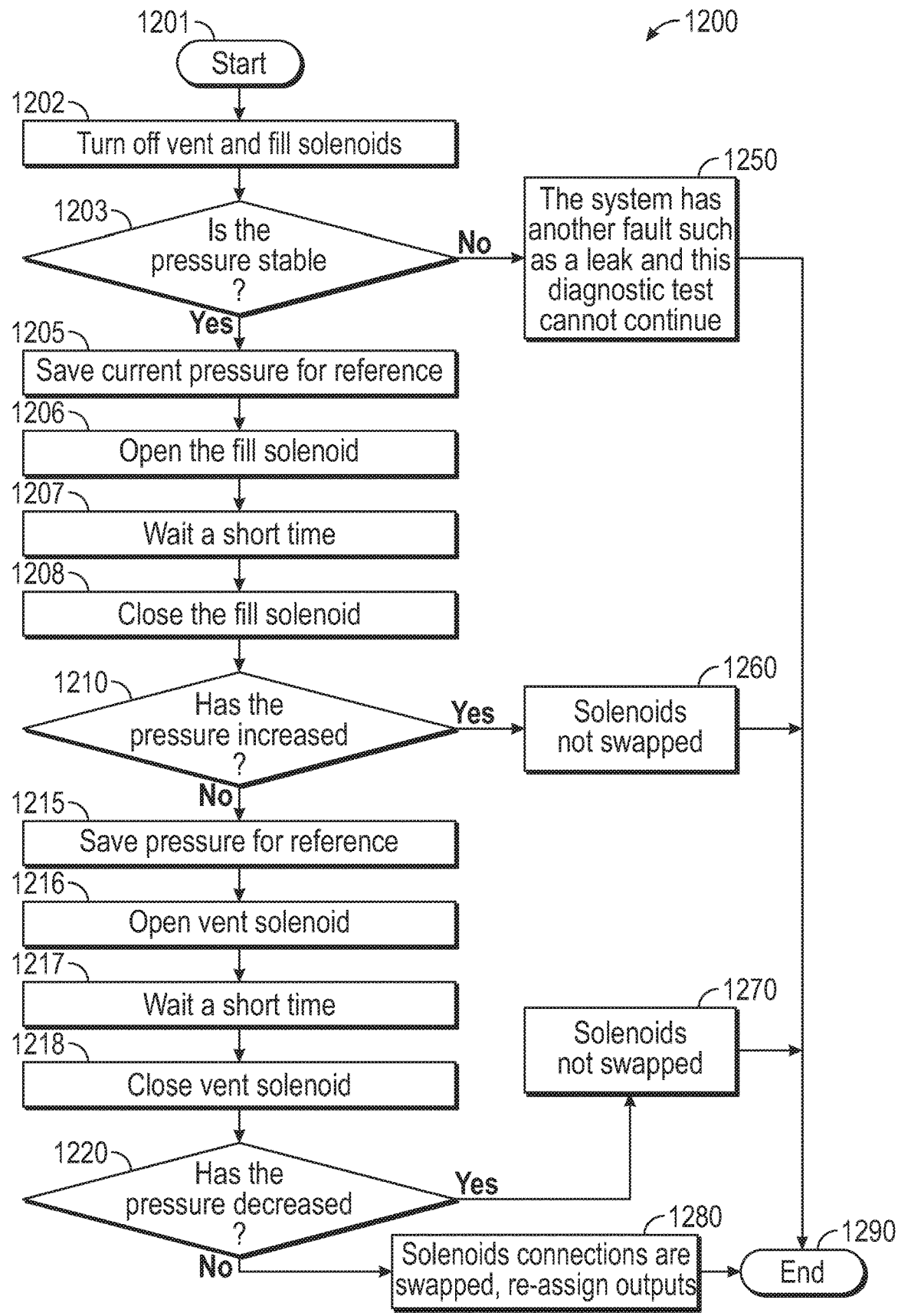
FIG. 12 is a flow chart illustrating an exemplary method of detecting if solenoid connections are incorrectly placed in accordance with certain teachings of the present disclosure.

Another set of circumstances that may lengthen the useful lives of solenoids may be enabled through the inventions disclosed herein. In some instances during the manufacturing process, the electrical connections for the vent and fill solenoids have been inadvertently incorrectly connected resulting in the vent solenoid input on the controller 16 being connected to the fill solenoid, and the fill solenoid input on the controller 16 being connected to the vent solenoid. Also, in some cases where maintenance is being performed, technicians have made the same error when reassembling frozen beverage machines. Undiscovered, these errors may result in the vent solenoid being activated during the fill process, and the fill solenoid being activated during the vent process. However, a process 1200 may be run to determine if this error has occurred, and if so, the error may be corrected in the software in the controller, rather than by physically reconnecting the electrical connections. FIG. 12 depicts such a process 1200.

This process 1200 may be run near the initialization of the frozen beverage dispenser, or it may be run at any time during its uptime. The process will start 1201 and processing will continue in step 1202, which turns the vent and fill solenoids off. Step 1203 determines if the pressure is stable. This may be performed by ensuring that neither the freeze nor defrost cycles are running and that there is no immediate pressure change. Other factors may also make the system unstable, such as a leak in the system, and should be checked before moving from this step. If any of the conditions that make the system unstable are present, processing moves to step 1250 that terminates the test by moving processing to step 1290. In this set of circumstances, it would be appropriate if an alarm were registered or some steps taken to notify an operator or technician.

Returning to step 1203, if the system is stable, processing moves to step 1205, which measures the pressure in the DCC. Processing then moves to steps 1206, 1207, and 1208, which allows some gas medium to enter the barrel. Under normal circumstances, this should increase the pressure. Processing then moves to step 1210, which compares the previously measured pressure to the pressure after the gas medium was allowed to enter the expansion tank. If the pressure has increased as expected, processing moves to step 1260, which establishes that the solenoid electrical connections are not swapped, and then processing terminates at step 1290.

Returning to step 1210, if the pressure has not increased, processing moves to step 1215. Here, similar to step 1205, the pressure in the DCC is measured. Steps 1216, 1217, and 1218 are performed which activates the vent solenoid for a short time. Under normal circumstances, this should decrease the pressure. Processing then moves to step 1220, which compares the previously measured pressure to the pressure after the gas medium was allowed to exit the expansion tank. If the pressure has decreased as expected, processing moves to step 1270, which establishes that the solenoid electrical connections are not swapped, and then processing terminates at step 1290.

Returning to step 1220, if the pressure has not decreased as expected, processing moves to step 1280, where it is determined that the solenoid electrical connections have been inadvertently swapped. The connection inputs may then be reassigned through software so the controller 16 is properly controlling the vent and fill solenoids.

Those skilled in the art will be able to utilize this and similar embodiments of the concepts disclosed herein without departing from the spirit of the disclosed inventions.

Another set of circumstances that may lengthen the useful lives of solenoids may be enabled through the inventions disclosed herein. The controller may detect a fault or error in the system and intelligently use the solenoids at a lower than normal frequency until the error or fault has been corrected. In one embodiment of the inventive concepts disclosed herein, the problem may be that the external supply of the gas medium may be temporarily unavailable. In a case where this may be carbon dioxide, this may be because the cylinder has emptied and needs to be replaced. In some prior art devices, the solenoid may continue to be activated in vain attempts at bringing the pressure to the desired level. This continued activation of solenoids may unduly shorten the life expectancy of a solenoid.

Figure 13:
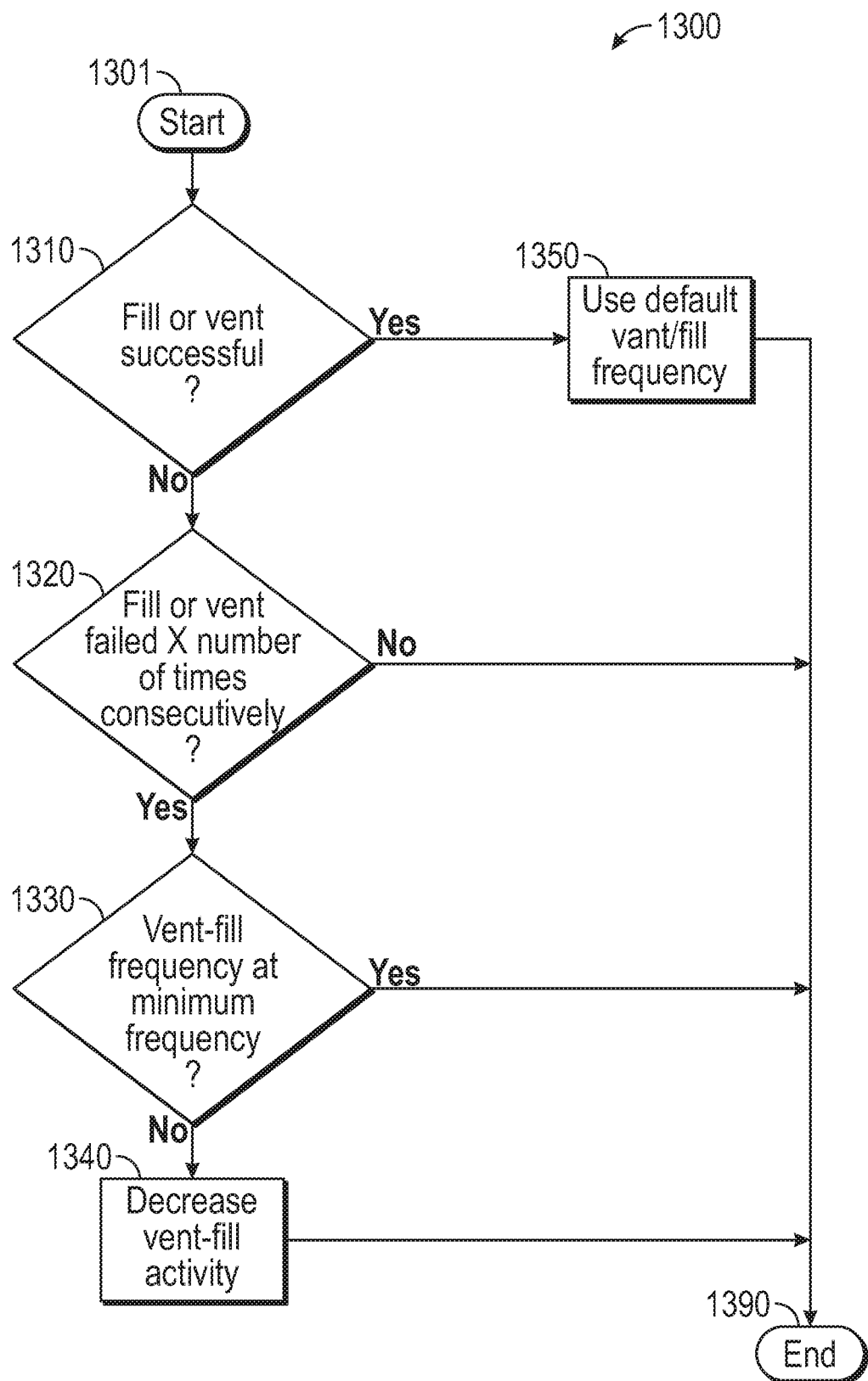
FIG. 13 is a flow chart illustrating an exemplary method of control used if a successive number of fills or vents are unsuccessful in accordance with certain teachings of the present disclosure.

Inventors have devised a method to detect error and fault conditions and intelligently utilize the solenoids to extend their useful lives. One embodiment may be seen in process 1300 in FIG. 13. In this embodiment, if the fill or vent operation is unsuccessful over a number of times, future attempts will be made less often.

Process 1300 starts 1301 with the variable and timers being initialized, and then processing moving to step 1310, which determines if the latest fill or vent operation was successful. If it was successful, processing moves to step 1350, which will continue to utilize the normal, or default, frequency for fill and vent operations. The normal, or default, fill and vent operations are generally associated with the process of regulating the pressure in the DCC and the barrel within the optimal pressure range, as well as within the acceptable pressure range, as has been described in this disclosure. Once step 1350 has been processed, the operation terminates at step 1390.

Returning to step 1310, if the previous fill or vent operation was unsuccessful, processing moves to step 1320. As was described earlier, an unsuccessful fill operation may occur when the external gas medium is unavailable, such as a cylinder of carbon dioxide becoming empty. Other types of vent or fill failures may be envisioned by those skilled in the art. Step 1320 will maintain a counter of the number of successive failures of the vent or fill operations. Once that number reaches a predetermined value, processing will move to step 1330. Until the counter reaches that number, processing will terminate at step 1390 but will restart at the end of the next vent or fill cycle.

If the number of successive unsuccessful fill or vent attempts reaches a predetermined limit, processing will move to steps 1330 and 1340. In these steps, a decision will be made to delay the successive attempts at a fill or vent operation for a predetermined amount of time, but not to exceed a maximum limit.

As an example of this, if a gas medium cylinder used for the active charge empties while the frozen beverage dispenser is still operational, the fill process will be unsuccessful. Under normal conditions, the fill process may be attempted once per minute. Left unchecked that frequency of operation may detrimentally affect the lifespan of the fill solenoid. However, with process 1300 described herein, once the fill process has failed 5 times, the time between attempts may be backed off to once every 5 minutes. Again, after 5 successive failed attempts, the time between attempts may be backed off to once every 10 minutes. This iteration may continue until a maximum back off timer is reached. Once a new cylinder is attached and placed in service, the fill operation will be successful and the back off time delay will be replaced with a normal time frequency for this operation.

To put all of this into perspective, in a stable frozen beverage machine, methods 500 and 600 will maintain the pressure of barrel to be within its desired specification. Under expected conditions of a freeze cycle, a defrost cycle, or dispensing of a drink, the methods 500 and 600 may be able to continue operations of the machine without broadening or narrowing the fill or vent parameters. However, if the machine is presented with some unexpected conditions such as dispensing many drinks in a very short period of time while thawing a barrel, the controller may broaden the fill pressure range, the vent pressure range, or both at the same time. Alternatively, the controls described herein may lengthen times between attempts or otherwise take measures to lengthen the service lives of various components. When conditions settle down, the controller will evaluate and will take appropriate actions to get the machine back to the stable state where it can immediately dispense drinks at optimal conditions. Broadening and narrowing the fill and vent conditions will allow the solenoids to maintain an acceptable product within the barrel while prolonging the lifespans of the fill and vent solenoids. Other mechanisms described herein will also serve to extend the lifespans of various components in a frozen beverage dispensing machine.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A frozen beverage machine, comprising:
   a freezing chamber having a product inlet and a product outlet;
   a refrigeration system configured to freeze a product in the freezing chamber;
   a dynamic charge control system comprising:
      a first chamber in fluid communication with the freezing chamber product inlet;
      a first pressure transducer fluidly coupled to the first chamber and configured to provide a first pressure signal representative of a pressure in the freezing chamber;
      a second chamber fluidly separated from the first chamber by a bladder and comprising a fluid port;
      a fluid fill valve fluidly communicating with a source of fluid and the second chamber port;
      a fluid vent valve fluidly communicating with the second chamber port for discharging fluid from the second chamber;
      a second pressure transducer fluidly coupled to the second chamber and configured to provide a second chamber pressure signal;
      a controller operationally coupled to receive one or both of the first and second pressure signals and to actuate the fluid fill valve or the fluid vent valve to align the freezing chamber pressure with a desired freezing chamber pressure; and
   wherein the controller is configured to dynamically adjust a first chamber pressure based on at least one operational characteristic of the the frozen beverage machine.

2. The frozen beverage machine of claim 1, wherein the operational characteristic is a characteristic of the product to be dispensed from the outlet of the freezing chamber.

3. The frozen beverage machine of claim 2, wherein the characteristic is a size of ice crystal in the product.

4. The frozen beverage machine of claim 1, wherein the fluid is carbon dioxide, nitrogen or air.

5. The frozen beverage machine of claim 1, further comprising:
   a beater inside the freezing chamber operationally linked to a motor;
   a motor sensor operationally coupled to the controller to sense when the motor is driven; and
   wherein one operational characteristic is an output from the motor sensor.

6. The frozen beverage machine of claim 1, further comprising:
   a refrigeration sensor operationally coupled to the controller to sense whether the refrigeration system is freezing, thawing or idle; and
   wherein one operational characteristic is an output from the refrigeration sensor.

7. The frozen beverage machine of claim 1, further comprising:
   a selection sensor configured to detect when a product selection has been made; and
   wherein one operational characteristic is that a product selection has been made.

8. The frozen beverage machine of claim 1, wherein the controller is capable of monitoring a time of day; and wherein one operational characteristic is the time of day.

9. The frozen beverage machine of claim 1, wherein the controller is capable of monitoring a day of week; and wherein one operational characteristic is the day of the week.

10. The frozen beverage machine of claim 1, wherein the controller is capable of monitoring a plurality of time intervals between activations of the fluid fill valve; and wherein one operational characteristic is a frequency of actuating the fluid fill valve.

11. The frozen beverage machine of claim 1, wherein the controller is capable of monitoring a plurality of time intervals between activations of the fluid vent valve; and wherein one operational characteristic is a frequency of actuating the fluid vent valve.

12. The frozen beverage machine of claim 1, wherein the controller is capable of receiving a successive signals representative of pressure in the second chamber, and activating either the fluid fill valve or the fluid vent valve to change the pressure in the second chamber in a predictable direction.

13. The frozen beverage machine of claim 12, wherein the controller is configured to delay a subsequent activation of the fluid fill valve or the fluid vent valve if a comparison between signals received before and after activation shows that the pressure in the second chamber changed in a direction substantially opposite the predicted direction.

14. The frozen beverage machine of claim 12, wherein the controller is configured to swap operational links to the fluid fill valve and the fluid vent valve if a comparison between signals received before and after activation shows that the pressure in the second chamber changed in a direction substantially opposite the predicted direction.

15. The frozen beverage machine of claim 1, further comprising:
   an approach sensor operationally coupled to the controller to monitor the approach of a user; and wherein one operational characteristic is an input from the approach sensor.

16. A frozen beverage machine, comprising:
   a freezing chamber having a product inlet and a product outlet;
   a refrigeration system for freezing a product in the freezing chamber;
   a gas chamber operationally coupled to but fluidly separated from the freezing chamber and configured to adjust a pressure in the freezing chamber;
   a gas chamber pressure transducer configured to generate a signal representative of pressure in the gas chamber;
   a gas fill valve operationally coupled to a source of a gas and operationally coupled gas chamber;
   a gas exhaust valve operationally coupled to the gas chamber;
   a controller operationally coupled to receive the signal from the gas chamber pressure transducer and to adjust the pressure in the freezing chamber based at least in part on the signal; and wherein the controller is configured to dynamically adjust the pressure in the gas chamber based on at least one operational characteristic of the frozen beverage machine.

17. The frozen beverage machine of claim 16, further comprising:
 a beater inside the freezing chamber operationally linked to a motor;
 a motor sensor operationally coupled to the controller to sense when the motor is active; and
 wherein one operational characteristic is a signal from the motor sensor.

18. The frozen beverage machine of claim 16, further comprising:
 a refrigeration sensor operationally coupled to the controller to sense whether the refrigeration system is freezing, thawing or idle; and
 wherein one operational characteristic is a signal from the refrigeration sensor.

* * * * *